(12) United States Patent
Petilli

(10) Patent No.: US 9,344,660 B2
(45) Date of Patent: May 17, 2016

(54) FOVEAL IMAGER READOUT INTEGRATED CIRCUIT (ROIC)

(71) Applicant: Intrinsix Corporation, Marlborough, MA (US)

(72) Inventor: Eugene M. Petilli, Victor, NY (US)

(73) Assignee: INTRINSIX CORPORATION, Marlborough, MA (US)

( * ) Notice: Subject to any disclaimer, the term of this patent is extended or adjusted under 35 U.S.C. 154(b) by 51 days.

(21) Appl. No.: 14/490,448

(22) Filed: Sep. 18, 2014

(65) Prior Publication Data

US 2015/0077613 A1 Mar. 19, 2015

Related U.S. Application Data

(60) Provisional application No. 61/879,276, filed on Sep. 18, 2013.

(51) Int. Cl.
*H04N 5/378* (2011.01)
*H04N 5/341* (2011.01)
*H04N 5/347* (2011.01)

(52) U.S. Cl.
CPC ............. *H04N 5/378* (2013.01); *H04N 5/341* (2013.01); *H04N 5/347* (2013.01)

(58) Field of Classification Search
CPC ....... H03M 1/747; H03M 3/30; H04N 5/3696
See application file for complete search history.

(56) References Cited

U.S. PATENT DOCUMENTS

| | | | |
|---|---|---|---|
| 4,661,713 A | 4/1987 | Besson et al. | |
| 4,786,831 A | 11/1988 | Morse et al. | |
| 4,803,363 A | 2/1989 | Gaalema et al. | |
| 5,233,180 A | 8/1993 | Tsuruta et al. | |
| 5,291,293 A | 3/1994 | Kapan | |
| 5,602,511 A | 2/1997 | Woolaway | |
| 5,856,918 A | 1/1999 | Soneda et al. | |
| 6,252,462 B1 | 6/2001 | Hoffman | |
| 6,455,831 B1 | 9/2002 | Bandera et al. | |
| 6,491,372 B1 | 12/2002 | Shioya et al. | |

(Continued)

OTHER PUBLICATIONS

U.S. Appl. No. 595,383, filed Jan. 13, 2015, Petilli.

(Continued)

*Primary Examiner* — Roberto Velez
*Assistant Examiner* — Cynthia Segura
(74) *Attorney, Agent, or Firm* — Daly, Crowley, Mofford & Durkee, LLP

(57) ABSTRACT

An image comprising a plurality of pixels at a predetermined pixel pitch, is received. A plurality of image intensity signals, are received at readout circuitry responsive to an image intensity per pixel. A portion of the received image is divided into a plurality of fixed paxels, each paxel comprising a rectilinear collection of pixels, having a first length and first predetermined number of rows, and second width having second predetermined number of columns. The plurality of fixed paxels are provided to a respective plurality of configurable Analog to Digital Converters (ADCs) responsive to a respective plurality of paxels and configurable to generate respective ADC output signals that implement a tradeoff between Effective Number of Bits (ENoB) and power consumption while maintaining a substantially fixed spatial frequency. Some paxels corresponding to a first predetermined fixation point are digitized with higher ENoB than the other paxels. A foveated image is generated.

19 Claims, 9 Drawing Sheets

(56) References Cited

U.S. PATENT DOCUMENTS

| | | | |
|---|---|---|---|
| 6,977,601 | B1 | 12/2005 | Fletcher et al. |
| 7,183,531 | B2 | 2/2007 | Olsen et al. |
| 7,492,400 | B2 | 2/2009 | El Gamal et al. |
| 8,314,850 | B2 | 11/2012 | Negishi et al. |
| 8,511,823 | B2 | 8/2013 | Black et al. |
| 9,001,234 | B2 | 4/2015 | Petilli |
| 2002/0180756 | A1* | 12/2002 | Lee .................. H04N 19/67 345/619 |
| 2004/0257078 | A1 | 12/2004 | Porter |
| 2006/0076473 | A1 | 4/2006 | Wilcken et al. |
| 2007/0253695 | A1 | 11/2007 | Miyazawa et al. |
| 2008/0317314 | A1 | 12/2008 | Schwartz et al. |
| 2010/0208092 | A1 | 8/2010 | Wang |
| 2010/0231767 | A1 | 9/2010 | Kikuchi |
| 2010/0283649 | A1* | 11/2010 | Bos .................. H03M 3/41 341/143 |
| 2011/0090024 | A1 | 4/2011 | Chen et al. |
| 2011/0150509 | A1 | 6/2011 | Komiya |
| 2012/0051658 | A1 | 3/2012 | Tong et al. |
| 2012/0113326 | A1 | 5/2012 | Nagaraja et al. |
| 2012/0218445 | A1 | 8/2012 | Petilli |
| 2013/0076553 | A1* | 3/2013 | Kuo .................. H03M 1/466 341/172 |
| 2014/0095102 | A1* | 4/2014 | Potyrailo .......... G01R 27/28 702/127 |
| 2015/0256768 | A1* | 9/2015 | Dolgin .............. H04N 5/332 348/164 |

OTHER PUBLICATIONS

U.S. Appl. No. 14/666,434, filed Mar. 24, 2015, Petilli.
Coath et al., "Advanced Pixel Architectures for Scientific Image Sensors," Rutherford Appleton Laboratory, Science and Technology Facilities Council, UK, https://heplnm061.pp.rl.ac.uk/display/spider/ pp. 57-61, Published on Sep. 25, 2009.
Notice of Allowance dated Sep. 5, 2014; for U.S. Appl. No. 13/405,406; 10 pages.
Request for Continued Examination dated Oct. 18, 2014; for U.S. Appl. No. 13/405,406; 2 pages.
Notice of Allowance dated Dec. 4, 2014; for U.S. Appl. No. 13/405,406; 11 pages.
312 Amendment dated Feb. 12, 2015; for U.S. Appl. No. 13/405,406; 6 pages.
U.S. Appl. No. 14/539,607, filed Nov. 12, 2014, Petilli.
Dr. Andrew T. Duchowski, Nathan Cournia, and Hunter Murphy, "Gaze-Contigent Displays: Review and Current Trends", CyberPsychology & Behavior, Dec. 2004, 7(6): 621-634. doi:10.1089/cpb.2004.7.621, vol. 7 Issue 6: Feb. 1, 2005.
Maricic, Danijel; "Images Sensors Employing Oversampling Sigma-Delta Analog-to-Digital Conversion with High Dynamic Range and Low Power", Department of Electrical and Computer Engineering Arts, Sciences and Engineering, Edmund A. Hajim School of Engineering and Applied Sciences, Unviersity of Rochester, Rochester, NY, 2011, 136 pages.
Tyrrell, Brian, & Berger, Robert, & Colonero, Curtis, &Costa, Joseph, & Kelly, Michael, & Ringdahl, Eric, & Schultz, Kenneth, & Wey, James of Lincoln Laboratory, Massachusetts Institute of Technology. Design Approaches for Digitally Dominated Active Pixel Sensors: Leveraging Moore's Law Scaling in Focal Plane Readout Design. *This work was sponsored by the United States Government under Air Force contract FA8721-05-C-0002,* Published Feb. 2008.
Tyrrell, Brian, & Anderson, Kirk, & Baker, Justin, & Berger, Robert, & Brown, Matthew, & Colonero, Curtis, & Costa, Joseph, & Holford, Brian, & Kelly, Michael, & Ringdahl Eric, & Schultz, Kenneth, & Wey, James. Time Delay Integration and In-Pixel Spatiotemporal Filtering Using a Nanoscale Digital CMOS Focal Plane Readout. *IEEE Transactions on Electron Devices,* vol. 56, No. 11, Nov. 2009.
Kelly, Michael, & Colonero, Curtis, & Tyrrell, Brian, & Schultz, Kenneth of Lincoln Laboratory, Massachusetts Institute of Technology. The Digital Focal Pine Array (DFPA) Architecture for Data Processing "On-Chip" Mil. Sens. Symp.Detector Spec. Gp., Feb. 2007, *This work was sponsored by the United States Government under Air Force contract FA8721-05-C-0002.*
Hill,Cory J., & Soibel, Alexander, & Keo, Sam A., & Mumolo, Jason. M., & Gunapala, Sarath. D. of Jet Propulsion Laboratory, California Institute of Technology, & Rhiger, David R., & Kvaas, Robert E., & Harris, Sean F of Raytheon Vision Systems. Infrared Imaging Arrays Based on Superlattice Photodiodes. *Infrared Technology and Applications XXXIV,* edited by Bjørn F. Andresen, Gabor F. Fulop, Paul R. Norton, *Proc. of SPIE* vol. 6940, 69400C, (2008) • 0277-786X/08 doi: 10.1117/12.783934, Published on Mar. 16, 2008.
Chen, Leonard, Hewitt, Mary', & Guibransen, Dave,& Pettijohn, Kevin, & Chen, Bryan, & Wyles, Richard of the Raytheon Infrared Center of Excellence. Overview of advances in high performance ROID designs for use with IRFPAs, Published on Apr. 24, 2000.
Das, Sankha dip, & Tan, Siew Li, & Zhang, Shiyong, & Goh, Yu Ling,& Tan, Chee Hing, & David, John of The Department of Electronic & Electrical Engineering, University of Sheffield. Development of LWIR Photodiodes Based on InAs/ GaSb Type II Strained Layer Superlattices. *6th EMRS DTC Technical Conference—Edinburgh 2009.*
Johnson, J. L., & Samoska, L. A., & Gossard, A. C. of The Department of Electrical and Computer Engineering, University of California, Santa Barbara, & Merz, J. L. of The Department of Electrical Engineering, University of Notre Dame, & Jack, M. D., & Chapman, G.R., & Baumgratz, B. A., & Kasai, K., & Johnson, S. M. of The Santa Barbara Research Center. Electrical and optical properties of infrared photodiodes using the InAs/Ga12xInxSb Superlattice in Heterojunctions with GaSb *J. Appl. Phys.* 80 (2), Jul. 15, 1996 0021-8979/96/80(2)/1116/12/$10.00.
Smith, D.L., of The Los Alamos National Laoratory, % Maihiot, C.of The Xerox Webster Research, Webster, NY. Proposal for Strained Type II Superlattice Infrared Detectors *J. Appl. Phys.* 62(6), Sep. 15, 1987 0021-8979/87/182545-04.
Zheng, L., & Tidrow, M.Z., & Novello, A., & Weichel, H., Vohra, S. Type II Strained Layer Superlattice: A Potential Infrared Sensor Material for Space. *Quantum Sensing and Nanophotonic Devices V,* edited by Rengarajan Sudharsanan, Christopher Jelen. *Proc. or SPIE* vol. 6900, 69000F (2008) • 0277-786X/08 • doi: 10.1117/12.768420, Published on Feb. 2008.
Tennant, W.E., & Lee, Donald, & Zandian, Magid, & Piquett Eric, & Carmody, Michael of Teledyne Imaging Sensors, MBE HgCdTe Technology—A Very General Solution to IR Detection, Described by "Rule 07", a Very Convenient Heuristic, Published on Sep. 2008.
Kavusi et al., "Quantitative Study of High Dynamic Range Sigma Delta-based Focal Plane Array Architectures", Department of Electrical Engineering, Stanford University, Stanford, CA 94305, Infrared Technology and Applications XXX, edited by Bjorn F. Andresen, Gabor F. Fulop, Proc. of SPIE vol. 5406 (SPIE, Bellingham, WA 2004) 0277-786X/04/$15—doi: 10.1117/12.548875, 10 pages, Published Apr. 12, 2004.
Mendis et al., "Design of a Low-Light-Level Image Sensor with On-Chip Sigma-Delta Analog-to-Digital Conversion", 0-8194-1133-7/93/$6.00; SPIE vol. 1900, 9 pages. (c) 1993: SPIE—The International Society for Optical Engineering, Published on Jul. 12, 1993.
U.S. Appl. No. 14/666,434 Notice of Allowance dated Mar. 28, 2016, 20 pages.
Restriction Requirement dated Jan. 22, 2016; U.S. Appl. No. 14/595,383; 6 pages.
Response dated Mar. 22, 2016 to Restriction Requirement dated Jan. 22, 2016; U.S. Appl. No. 14/595,383; 2 pages.
Notice of Allowance dated Mar. 28, 2016; U.S. Appl. No. 14/666,434; 20 pages.
Office Action dated Apr. 8, 2016; U.S. Appl. No. 14/595,383; 25 pages.

* cited by examiner

FOVEAL IMAGER READOUT INTEGRATED CIRCUIT (ROIC)

CROSS REFERENCE TO RELATED APPLICATIONS

This application claims priority to U.S. provisional application filed on Sep. 18, 2013, having Ser. No. 61/879,276, inventor Eugene M. Petilli, entitled "Foveal Imager Readout Integrated Circuit (ROIC," which is hereby incorporated by reference.

In addition, at least some of the disclosures herein are intended to be usable with many different types of ROIC architectures, especially those that are based on sigma-delta modulators (SDM), including but not limited to systems, methods, and apparatuses such as the Imager Readout Architecture utilizing analog to digital (A/D) converter, which was described in commonly assigned, commonly invented published United States patent application number 20120218445 (which application is hereby incorporated by reference) (hereinafter "'445 application"), which was published on Aug. 30, 2012, filed on Feb. 27, 2012, and which claims priority to Provisional Patent Application No. 61/446,582, filed Feb. 25, 2011, entitled "Imager Readout Architecture Utilizing A/D Converters (ADC)," inventor Eugene M. Petilli.

FIELD

This disclosure is broadly related to imaging systems and readout integrated circuit (ROIC) devices. In particular, in at least one aspect, the exemplary embodiment relates to a foveal imager ROIC capable of reduced overall power with optimized foveal image quality. In a further aspect, the foveal ROIC is usable with and applicable to digitization of focal plane imager arrays, including but not limited to strained layer superlattice imagers (SLS), using sigma delta modulator (SDM) based analog to digital converters (SDM ADC). At least one disclosed embodiment is further related to design of application specific integrated circuits (ASICs) to implement foveal ROICs.

BACKGROUND

The human eye is made up of three coats, or layers, enclosing three transparent structures. The outermost layer is composed of the cornea and sclera. The middle layer consists of the choroid, ciliary body, and iris. The innermost coat is the retina, which gets its circulation from the vessels of the choroid as well as the retinal vessels. The retina is a light-sensitive layer at the back of the eye that covers about 65 percent of its interior surface. The human eye contains two kinds of photoreceptor cells; rods and cones. These photoreceptor cells are photosensitive and convert incident light energy into signals that are carried to the brain by the optic nerve.

In the middle of the retina is a small dimple called the fovea (also known as the fovea centralis). The fovea is the center of the eye's sharpest vision and the location of most color perception; it is responsible for providing the brain with detailed image information, necessary for precise recognition of objects and shapes used in activities such as reading, driving and operating machinery. In most individuals, the fovea covers about 2 degrees of visual angle. In concentric fashion, the parafovea, perifovea and peripheral regions surround the fovea and provide increasingly diminished resolution. To get a clear view of the world, the brain must turn the eyes so that the image of the object of regard falls on the fovea. Eye movements are thus very important for visual perception, and any failure to make them correctly can lead to serious visual issues.

Foveal imaging (also known as space variant imaging or gaze contingent imaging) is a digital image processing technique where the image resolution, or amount of detail, varies across the image, in a manner similar to that of the human eye, according to one or more so-called "fixation points." Generally, a fixation point designates the highest resolution region of a given image and corresponds to the center of the eye's retina (i.e., the fovea). Depending on the image processing being used, fixation point location can be specified in different ways. For example, in some environments, a pointing device, such as a computer mouse, can specify a fixing point within an image displayed on a computer monitor. In other environments, computer algorithms also can automatically determine fixation points in images.

In some embodiments, the location and type of a fixation point can vary depending on the application in which the method, device, or system is being used. For example, in one embodiment, an application can have a static fixation point (like the crosshair examples described herein). In another embodiment, an application can have a dynamic fixation point (one illustrative example of such an application is a facial recognition application, such as facial recognition software running on a video stream looking at a crowd of people but wanting only to process the data from the faces). Before the current frame is digitized (i.e., before power is consumed), it is advantageous, in at least some embodiment, to recognize, determine, or even predetermine, which paxels to spend power on to increase ENoB for those paxels. This selective selection of preferred paxels on which to spend power has advantages over approaches that digitize most or all of an entire frame at or close to maximum ENoB. For example, if an entire image frame is digitized at maximum ENoB, and the result is later foveated, there is much less opportunity (perhaps no opportunity) to reduce power consumption of the ADC.

In still further environments such as human perception experiments, devices can be used to measure the position and movement of a human eye (e.g., eye tracker devices). Eye trackers, which can be used to manipulate an image on a computer display, also can be used to determine fixation points. Eye tracking, as is known in the art, is the process of measuring either the point of gaze (where one is looking) or the motion of an eye relative to the head. A display able to be manipulated via eye tracker is known as a gaze contingent display. Gaze-Contingent Displays (GCDs) attempt to balance the amount of information displayed against the visual information processing capacity of the observer through real-time eye movement sensing.

SUMMARY

The following presents a simplified summary in order to provide a basic understanding of one or more aspects of the at least one disclosed embodiment. This summary is not an extensive overview of the at least one disclosed embodiment, and is neither intended to identify key or critical elements of the at least one disclosed embodiment, nor to delineate the scope thereof. Rather, the primary purpose of the summary is to present some concepts of the at least one disclosed embodiment in a simplified form as a prelude to the more detailed description that is presented later.

Applications for foveal imaging include image compression, image sensing hardware, and night vision systems. A useful background on some exemplary foveal imaging integrated circuits can be found in U.S. Pat. No. 6,455,831, entitled "CMOS Foveal Image Sensor Chip," issued Sep. 24, 2002. The contents of this patent are incorporated by reference.

The inventor of the embodiments claimed in the present disclosure has investigated several unique approaches to developing a foveal imager circuit (ROIC). In one embodiment, the foveal imager ROIC uses an architecture based on the strained layer superlattice imagers (SLS) using sigma delta modulator (SDM) based analog to digital converters (SDM ADC), as described in the aforementioned, incorporated-by-reference published '445 published patent application. In further embodiments, foveal imaging ROIC's are implemented at least in part using application specific integrated circuits (ASICs) to implement foveal imaging ROICs. In addition, at least some of the unique approaches discussed herein are applicable to embodiments where the foveal imager ROIC is configured as part of a focal plane imager array, or a Back Side Illuminated CMOS (BSI-CMOS), or a Quantum Well Infrared Photodetector (QWIP), or a Corrugated QWIP.

In one embodiment, an SDM ADC is applied to be part of an architecture of a foveal imager ROIC designed for an SLS imager (as well as other types of imagers, as noted herein). SDM ADCs have various advantages, at least some including being high resolution, low power, and having repeatable performance that does not depend on matching of components. While SDM ADCs have become the standard converter in the audio applications, they have not typically been applied to imaging applications. In addition, by recognizing and using the spatial frequency bandwidth limit of optical systems, and the subsequent temporal band limit, and by using a method such as the serpentine readout method disclosed in the aforementioned '445 application, the embodiments of the at least one disclosed embodiment provide a foveal imager ROIC apparatus, system, and method that overcome limitations of prior art systems. The serpentine read out method digitizes the output of substantially adjacent pixels in a serpentine sequence and on boundaries creates buffer pixels; in at least some embodiments described herein, the serpentine readout method is adapted to be used help read out a rectilinear collection of pixels (termed "paxels").

In one embodiment, an imaging method is provided, comprising the following unordered steps. (a) An image is received for processing, the image comprising a plurality of pixels, each respective pixel at a predetermined pixel pitch. (b) A plurality of image intensity signals are received, the image intensity signals corresponding to an intensity of the received image. (c) At least a portion of the image intensity signals are received at readout circuitry responsive to an image intensity per pixel. (d) At least a portion of the image is divided into a plurality of fixed paxels, each respective paxel comprising a rectilinear collection of pixels, wherein each paxel has a first length having a first predetermined number of rows and a second width having a second predetermined number of columns. (e) The plurality of fixed paxels are provided to respective plurality of configurable Analog to Digital Converters (ADCs), each ADC responsive to a respective plurality of paxels, wherein the plurality of ADCs are configurable to generate respective ADC output signals based at least in part on implementing a tradeoff between Effective Number of Bits (ENoB) and power consumption while maintaining a substantially fixed spatial frequency. (f) At least a portion of the configurable ADCs are set such that the paxels corresponding to a first predetermined fixation point are digitized with a higher ENoB than the other paxels. (g) A foveated image is generated based at least in part on the received image and at least in part on at least one of ENoB, power consumption, spatial frequency, and fixation point.

In a further embodiment, at least a portion of the paxels are arranged into slices with a plurality of ADCs per slice. In a further embodiment, the configurable ADCs comprise Sigma-Delta Modulators (SDMs), each respective SDM comprising a plurality of resonator coefficients and being capable of operating over a plurality of Over Sampling Ratios (OSRs).

In another embodiment, the imaging method further comprises the unordered steps of: (h) configuring a plurality of digital decimation filters for corresponding temporal over-sampling ratios (OSRs); and (i) reconstructing multi-bit pixel data with higher ENoB for ADCs with higher OSR while maintaining a constant spatial output sample rate, the spatial output sample rate being independent of OSR.

The configurable ADCs, in some embodiments, comprise Successive Approximation Register (SAR) ADCs.

In a further embodiment of the imaging method, the method includes (h) creating a serpentine readout sequence based at least in part on the at least a portion of image intensity signals. In one embodiment, the serpentine readout is configured to limit a temporal bandwidth.

In one embodiment, the serpentine readout that is created further comprises the unordered steps of:

(h-1) selecting a first starting point starting at a first end of a first row of pixels in the image;

(h-2) sequencing columns of pixels across the first row of pixels, beginning at the first starting point, in a first direction away from the first starting point and towards a first ending point that is at a second end of the first row of pixels, the second end being opposite to the first end;

(h-3) advancing to a second row of pixels, the second row being a row located substantially, adjacent, in a first vertical direction, to the first row of pixels;

(h-4) selecting a second starting point in the second row corresponding to a location substantially aligned to the first ending point and with the last column read in step (g-2);

(h-5) sequencing the columns of pixels, across the second row, in a second direction that is opposite to the first direction, towards a second ending point that is substantially aligned to the first starting point; and (h-6) advancing to a third row of pixels, the third row of pixels being a row located immediately adjacent, in the first vertical direction, to the second row of pixels; and (h-7) repeating steps (g-1) through (g-6), to advance through at least a portion of the image, until a predetermined condition is reached.

In one embodiment, in step (h-2), the column associated with the first pixel of each row is sequenced twice before sequencing to the remaining pixels of the row; wherein sequencing the first column associated with the first pixel twice helps minimize a temporal bandwidth input to the ADC.

In one embodiment, the image received for processing is provided by a detector array comprising at least one of (a) a photovoltaic device operating in a near zero volt bias mode and (b) a photoconductive device operating in a reverse bias mode.

In one embodiment of the imaging method, at least one of the following conditions is applied before generating the foveated image:

h. at least a portion of the configurable ADCs are configured for lower ENoB to reduce power consumption and higher ENoB for improved fidelity; and i. at least a portion of the paxels are adjusted for a predetermined tradeoff between power, bandwidth, dynamic range, and Signal to Noise Ratio (SNR).

In one embodiment of the imaging method, the ENoB settings for at least a portion of the paxels are modified between frames to modify the first predetermined fixation point. For example, in one embodiment, the modification of the first predetermined fixation point is based at least in part on a determination of a field of view made by an eye tracking system. In one embodiment, the imaging method further comprises creating multiple predetermined fixation points on the received image.

In a still further embodiment, the imaging method further comprises the unordered steps of:

h. digitizing at least one paxel by a primary and secondary ADC with independently configured ENoB; and i. digitally combining the outputs from the primary and secondary ADC.

In another embodiment, the imaging method further comprises the unordered steps of:

h. digitizing at least one paxel using at least a primary and secondary ADC selected from the plurality of configurable ADCs; and i. displaying independently configured ENoB and ADC digital outputs on alternate frames such that the ENoB and ADC digital outputs are capable of being optically combined by an observer of the alternate frames.

In a further aspect of the imaging method, at least a portion of the unordered steps a. through g. are configured to emulate at least a portion of human foveal response.

In another embodiment, the imaging method further comprises the unordered steps of:

h. defining, within a frame of the received image, a plurality of adjacent concentric foveal regions, each respective adjacent concentric foveal region having a respective center origin around the first fixation point and a respective outer boundary located concentrically either within or around adjacent respective concentric foveal regions; and i. wherein, as the respective outer boundary of a first respective foveal region in the plurality of foveal regions gets closer to the first fixation point, the image processing associated with the given first respective foveal region uses a respective first ENoB sufficiently high to ensure increasing image quality the closer the given respective foveal region is to the first fixation point.

In a further embodiment, settings for at least one of the center origins and outer boundaries are based at least in part on received information related to at least of a sensed and tracked position of at least one pupil of the eyes of a subject.

In another aspect, a foveal imager readout integrated circuit (ROIC) imager readout architecture is provided, comprising a readout circuit, control input, divider module, a plurality of configurable analog to digital converters (ADCs), means for receiving information related to at least one of eye position, pupil position, and fixation point; and a processor.

The readout circuit is configured to receive an image for processing and a plurality of image intensity signals corresponding to an intensity of the received image. The control input is configured to receive a plurality of control signals, at least a portion of the control signals usable during processing of the received image. The divider module is in operable communication with the readout circuit, the divider module configured to divide at least a portion of the image into a plurality of fixed paxels, each respective paxel comprising a rectilinear collection of pixels, wherein each paxel has a first length having a first predetermined number of rows and a second width having a second predetermined number of columns. The plurality of configurable ADCs are implemented such that each respective ADC is responsive to a respective plurality of paxels provided by the divider module, wherein the plurality of ADCs are configurable, using the control signals, to generate respective ADC output signals based at least in part in on implementation of a tradeoff between Effective Number of Bits (ENoB) and power consumption while maintaining a substantially fixed spatial frequency. The means for receiving information related to at least one of eye position, pupil position, and fixation point can comprise, for example, a gaze dependent display, eye tracker system facial recognition system, or other suitable system. The processor is configured to generate a foveated image based at least in part on the respective plurality of ADC output signals and the information related to at least one of eye position, pupil position, and fixation point, the foveated image comprising at least a first image frame that comprises at least a first foveal region, the first foveal region having a first center oriented around a first fixation point.

Details relating to these and other embodiments of the at least one disclosed embodiment are described more fully herein.

BRIEF DESCRIPTION OF THE FIGURES

The advantages and aspects of the various embodiments disclosed herein will be more fully understood in conjunction with the following detailed description and accompanying color drawings, in which.

The drawings are not to scale, emphasis instead being on illustrating the principles of the disclosed embodiments. In addition, in the drawings, like reference numbers indicate like elements.

DETAILED DESCRIPTION

Figure 1:
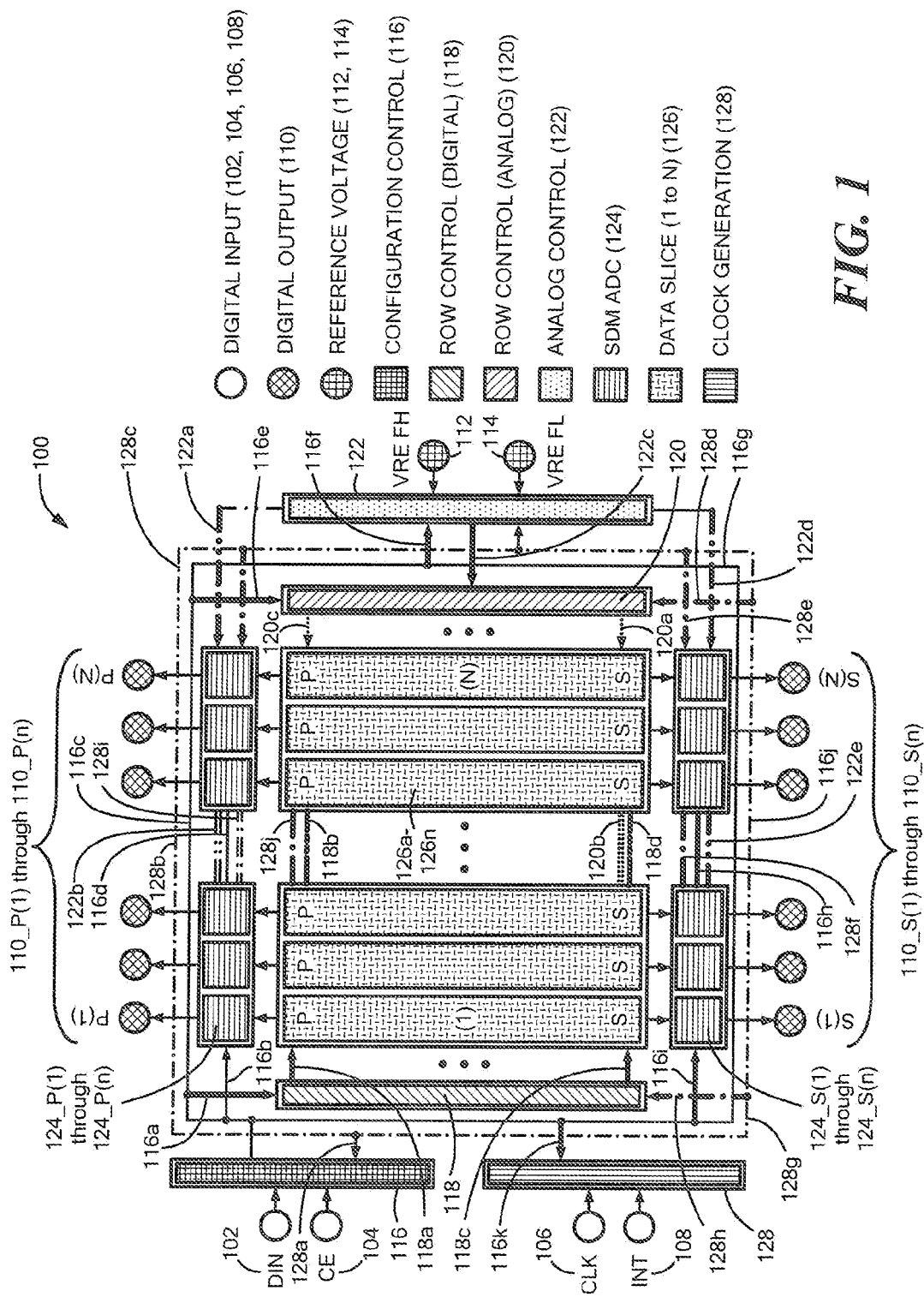
FIG. 1 is a block diagram of a Foveal Imager ROIC, in accordance with one exemplary embodiment.

FIG. 1 is a block diagram of an illustrative Foveal Imager ROIC 100, in accordance with one exemplary embodiment. Referring to FIG. 1, the Foveal imager ROIC 100 includes a primary readout stream side (shown on the top of FIG. 1), corresponding to digital outputs 110_P(1) through 110_P(n), and a secondary readout stream side (shown at the bottom of FIG. 1), corresponding to digital outputs 110_S(1) through 110_S(n). The ROIC 100 has several digital inputs 102, 104, 106, 108 (shown as white circles in FIG. 1), including Digital Input in ($D_{in}$) 102, Chip Enable (CE) 104, Clock (CLK) 106, and Interrupt (INT) 108. There are a plurality of digital outputs (shown as gray circles in FIG. 1), including 110_P(1) through 110_P(n), corresponding to the primary (P) readout stream and 110_S(1) through 110_S(n), corresponding to the secondary (S) readout stream, shown on bottom side of FIG. 1).

Additional inputs to the Foveal Imager ROIC 100 include two reference voltages, corresponding to a high reference voltage (VREFH) 112 and a low reference voltage (VREFL) 114, each of which is set, in this exemplary embodiment, to standard CMOS voltage ranges (although this is not limiting).

The $D_{in}$ 102 and CE 104 digital input signals provide inputs to the configuration control circuit 116 (which is shown in a square cross hatch pattern in FIG. 1). Configuration control outputs 116a through 116k, of the configuration control circuit 116, are routed, as shown in FIG. 1, to each of the first in the series of sigma delta modulator (SDM) analog to digital converter (ADC) circuits 124 on the primary readout side (i.e., 124_P(1) through 124_P(n), which are illustrated as shaded with horizontal lines in FIG. 1), and also to the first in the series of SDM ADC circuits on the secondary readout side 124_S(1) through 124_S(n) (also illustrated as shaded with horizontal lines). The configuration control output signals 116a through 116k from the configuration control circuit 116 tell the sub-circuits (e.g., the digital row control circuit 118, analog row control circuit 120, analog control circuit 122, SDM ADC's 124, etc.) the specific fidelity these circuits should be operating at, based at least in part on the part of the image that the sub-circuit is processing at any particular moment. In at least some embodiment, the fidelity is expressed as a measure based on Effective Number of Bits (ENoB, which is a measure of the fidelity of the digital representation of the analog signal; that is, the higher the ENOB, the better the overall accuracy and signal fidelity of the ADC output.

In at least some embodiments, the configuration control outputs 116a through 116j include information that controls one or more of ENoB, power consumption criteria, spatial frequency criteria, fixation point criteria, and/or tradeoff criteria (e.g., how to perform tradeoff analysis in weighing the importance of the various criteria during processing of an image). In at least some embodiments, the ADCs 124 are configurable and comprise Sigma-Delta Modulators (SDMs), each respective SDM comprising a plurality of resonator coefficients and being capable of operating over a plurality of Over Sampling Ratios (OSRs). In one embodiment, the ADCs are configurable and comprise Successive Approximation Register (SAR) ADCs.

In a still further embodiment, the circuit arrangement of FIG. 1 can be used with a plurality of digital decimation filters, which can be configured for corresponding temporal oversampling rations (OSRs). In this embodiment, multi-bit pixel data can be reconstructed with higher ENoB for ADCs with higher OSR while maintaining a constant spatial output sample rate, the spatial output sample rate being independent of OSR.

In one embodiment, the output of the SDM 124 is, for example, 1 bit at OSR x output data rate. The decimation filter (not shown in FIG. 1) takes the output of the SDM 124 and creates the N bit output at the lower data rate. Although a digital decimation filter is not required for all embodiments of the invention, use of a digital decimation feature can provide certain advantages in at least some embodiments, as will be appreciated. The ENoB, in some embodiments, ideally would be the same before or after the decimation filter but the temporal bandwidth is reduced by the OSR. Although the digital decimation filter is not shown in FIG. 1, it some embodiments, the digital decimation filter is located between the digital output of the SDM 124 and the circle (labeled in FIG. 1 as 110) which represents the digital output of the SDM 124.

Accordingly, at least some of the outputs 116a through 116j of the configuration control circuit 116 also are routed to a digital row control circuit 118 (shown as shaded in right-side pointed diagonal line in orange in FIG. 1), an analog row control circuit 120 (shown as shaded in left-side pointed diagonal lines in FIG. 1), an analog control circuit 122 (shaded in dotted lines in FIG. 1), and the clock generation circuit 128 (shaded in vertical lines in FIG. 1).

The CLK 106 and INT 108 digital input signals provide inputs to the clock generation circuit 128. Clock Outputs 128a through 128 j) of the clock generation circuit 128, shown in bright green in FIG. 1, are routed, as shown in FIG. 1, to the digital row control circuit 118, analog row control circuit 120, analog control circuit 122, to the first (124_P(1) in the series of SDM ADC's 124 on the primary readout stream side, and to the first (124_S(1) in the series of SDM ADC's 124 on the secondary readout stream side. SDM12_each of the SDM ADC's 124a-124i.

The digital row control outputs (118a through 118d) of the digital row control circuit 118 provides inputs to first data slice 126_P(1) (on the primary readout side) and the first data slice 126_S(1) (on the secondary readout side). These inputs are propagated through each data slice 126 on each of the respective primary and secondary sides. Note that the data slices 126(1) through 126(n) are shown in diagonal cross hatching in FIG. 1.

The analog row control outputs (120a through 120c) of the analog row control circuit 120 provide inputs to the last data slice 126_P(n) (on the primary readout side) and the last data slice 126_S(n) (on the secondary readout side). These inputs are propagated through each data slice 126 on each of the respective primary and secondary sides.

The outputs of the analog control circuit 122 (122a through 122e) provide inputs to the last in the series of SDM ADC's 124_P(n) on the primary readout side and to the last in the series of SDM ADC's 124_S(n) on the secondary readout side.

Figure 3:
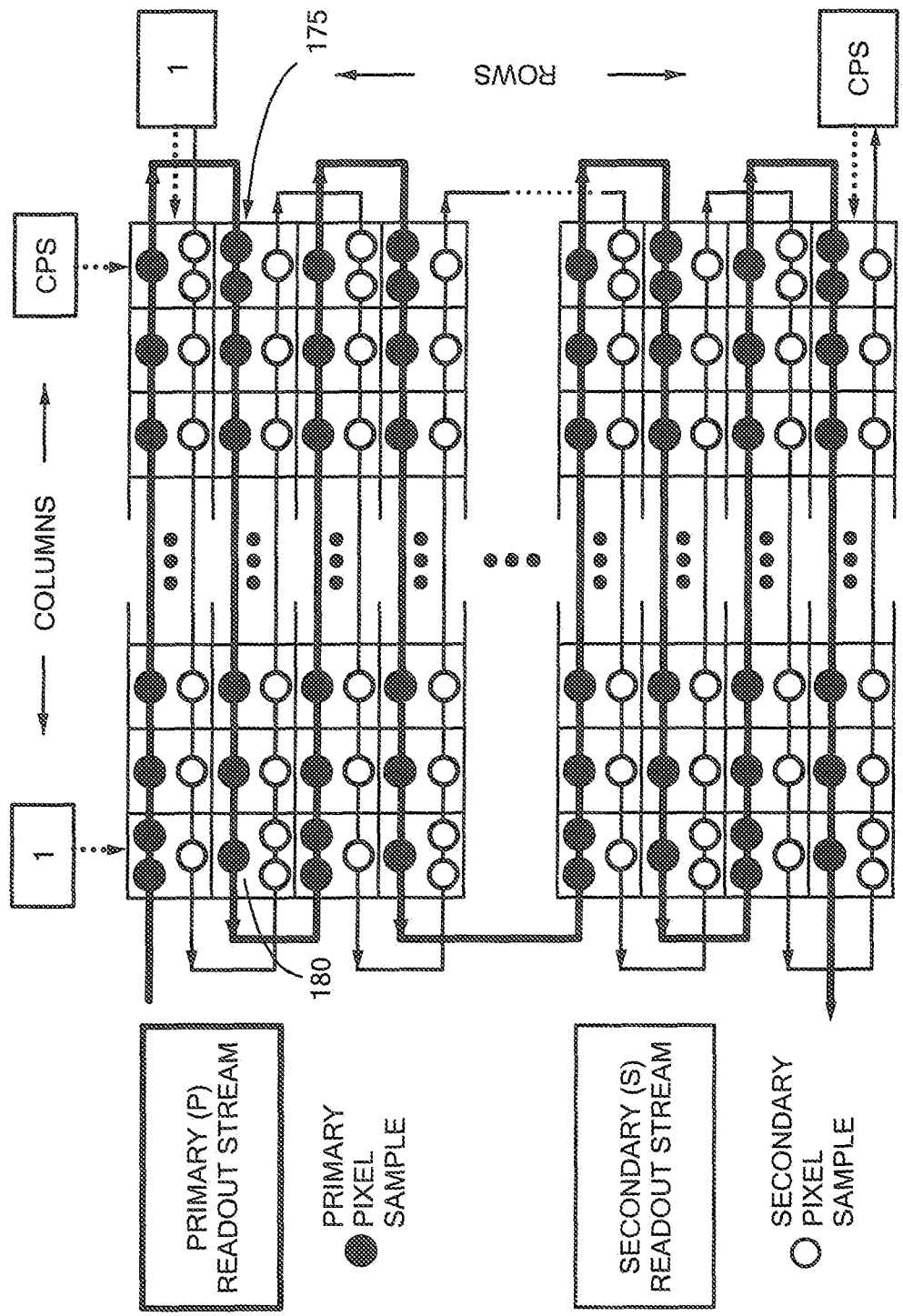
FIG. 3 is an illustrative diagram of a Serpentine Paxel Readout, in accordance with one embodiment.

In order to provide a way to independently manipulate multiple areas of the imager, the data slices 126 illustrated in FIG. 1 above are further sub-divided into fixed CPS×CPS paxels (where CPS=Columns Per Slice) as indicated in FIG. 3, which is a diagram of Image Frame Organization, in accordance with one embodiment of the at least one disclosed embodiment. A paxel, therefore, is comprised of a rectilinear collection of pixels. At least a portion of the paxels can be arranged into slices with a plurality of ADCs per slice.

Figure 2:
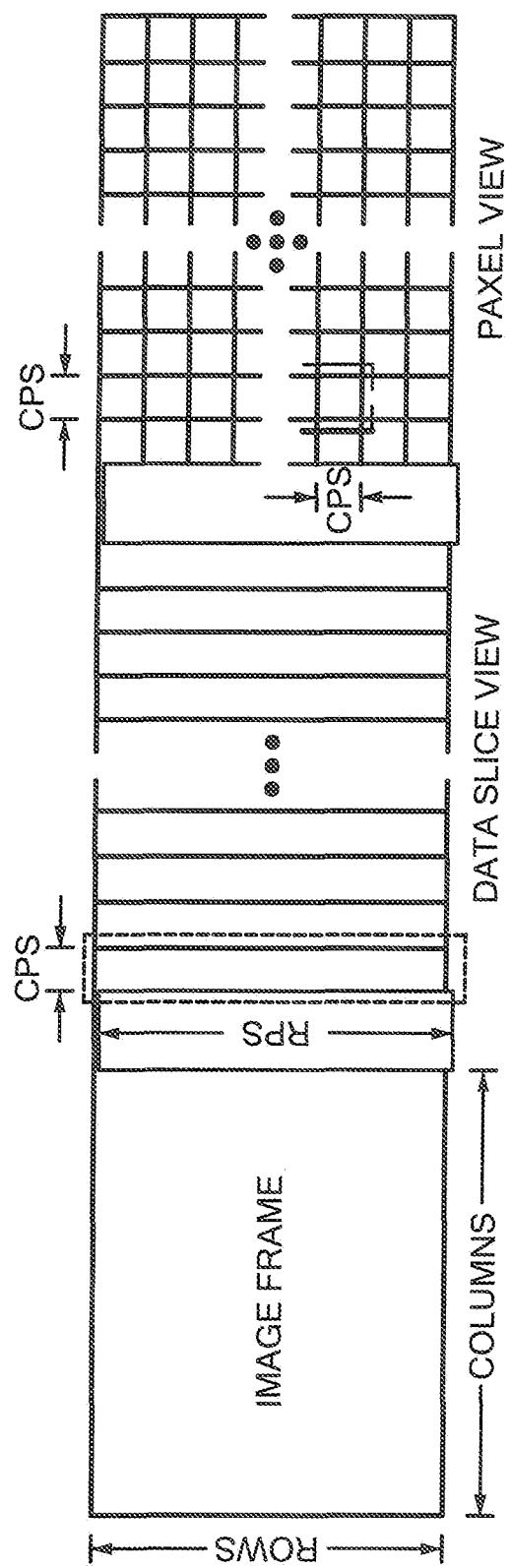
FIG. 2 is a diagram of Image Frame Organization, in accordance with an exemplary embodiment.

Thus, in one aspect, a foveal imager readout integrated circuit (ROIC) imager readout architecture is provided. This architecture includes a readout circuit, a control input, a divider module (which can be implemented using a process (e.g., run by a processor, e.g., in operable communication with the device of FIG. 1) that can implement one or more of the techniques for subdividing a frame of an image, as shown in FIG. 2). In at least some embodiment, the ROIC is in operable communication with one or more means for receiving information related to at least one of eye position, pupil position, and fixation point, such as eye tracking circuits or devices, gaze contingent displays, and the like.

The readout circuit is configured to receive an image for processing and a plurality of image intensity signals corresponding to an intensity of the received image The control input is configured to receive a plurality of control signals, at least a portion of the control signals usable during processing of the received image.

The divider module is in operable communication with the readout circuit, the divider module configured to divide at least a portion of the image into a plurality of fixed paxels, each respective paxel comprising a rectilinear collection of pixels, wherein each paxel has a first length having a first predetermined number of rows and a second width having a second predetermined number of columns.

The processor (or other controller) is configured to generate a foveated image based at least in part on the respective plurality of ADC output signals and the information related to at least one of eye position, pupil position, and fixation point, the foveated image comprising at least a first image frame that comprises at least a first foveal region, the first foveal region having a first center oriented around a first fixation point.

The plurality of configurable analog to digital converters (ADCs) are each respective ADC responsive to a respective plurality of paxels provided by the divider module. The plurality of ADCs are configurable, using the control signals, to generate respective ADC output signals based at least in part in on implementation of a tradeoff between Effective Number of Bits (ENoB) and power consumption while maintaining a substantially fixed spatial frequency. For example, one tradeoff considered, in one embodiment, takes into account the fact that the relative cost of ENoB vs power changes, potentially dynamically, depending on the application (e.g., how an ROIC or other imager is used). For certain applications, power can be increased to increase ENoB on a frame by frame basis.

The means for receiving information related to at least one of eye position, pupil position, and fixation point can be implemented using any hardware or software capable of acquiring this information, such as eye tracking systems. Note that, in at least some embodiments, the systems, methods, and/or apparatuses that provide eye position information are separate systems, devices, and systems from the imager provided herein. For example, in one embodiment, such eye tracking information is provided by a camera watching where the pupils are pointed and adjusting the fixation point of the foveal camera to match the object the user is looking at, where the information captured by the camera is provided to the system, method or apparatus herein. Alternatively, in some embodiments, a foveal camera is configured to be movable, such as on movable stages, where the foveal camera is mechanically pointed a new direction based on eye tracking.

Referring now to FIG. 3, in one embodiment, each paxel, as illustrated in the FIG. 2 "PAXEL VIEW", is read out using the serpentine method (e.g., as described in the published '445 patent application and as further explained), as further indicated in FIG. 3, below, thus greatly reducing, or at least minimizing, fixed pattern noise.

For example, in one embodiment, the serpentine readout is implemented based at least in part on image signals and image intensity signals received at the digital input 102 (FIG. 1), where the image intensity signals can, for example, be received at a detector array (not shown in FIG. 1) that is implemented to detect an image and provide, to the digital input 102, signals corresponding to image intensity, where the image comprises a plurality of pixels at specified pixel pitch. For example, in one embodiment, the detector array comprises a photovoltaic device, such as a photodiode, operating in a near zero volt bias mode. In one embodiment, the detector array comprises a photoconductive device, such as a photodiode, operating in a reverse bias mode.

The image intensity per pixel signals are received at readout circuitry (see FIG. 1) that is responsive to the image intensity per pixel and which is controlled by row control selection logic (118, 120) and column control selection logic.

For example, the serpentine readout can be configured to limit a temporal bandwidth of the image signal. In one aspect, to create the serpentine readout, a starting point is chosen, such as a first end of a first row of pixels in the image being processed. Referring again to FIG. 3, the first end would be at the pixel labeled "1". Note that, In FIG. 3, the primary (P) readout stream is shown in thick black line, and the secondary (S) readout stream is shown in thinner gray line.

After the starting point is selected, columns of pixels are sequenced across the first row of pixels, beginning at the first starting point, in a first direction away from the first starting point and towards a first ending point that is at a second end of the first row of pixels, the second end being opposite to the first end. In FIG. 3, for example, the first ending point is where the "CPS" label appears. Next, the readout advances to the next (second) row of pixels, where the second row is located substantially adjacent, in a first vertical direction, to the first row of pixels. Note that, by "substantially adjacent," it is not required that the next row of pixels, in the serpentine readout, be directly adjacent (although in at least some embodiments, the image quality is better the more adjacent the row is to the starting row). For example in at least one embodiment, after advancing through an initial row, the readout may advance to a second row that is two rows away, so as to be approximately or substantially adjacent to the starting row. In another embodiment, after advancing through a starting row, the readout advances to the row that is directly adjacent.

For example, in FIG. 3, the second row is in a downward vertical direction, when viewed from the top of the Figure. Then, the readout continues beginning at a second starting point in the second row that corresponds to a location that is substantially aligned with the first ending point and the last column read (corresponding to the reference label "175" in FIG. 3).

Next, the columns of pixels in the second row are sequenced, in a second direction that is opposite to the first direction, towards the second ending point 180 that is substantially aligned to the first starting point. Then, the processing is advanced to the third row of pixels, the third row being adjacent, in the first vertical direction, to the second row of pixels, and processing is repeated until all rows in the portion of the image are processed, In another embodiment, the serpentine readout method described in the aforementioned, incorporated-by-reference '445 patent application can be used. This method also digitizes the output of adjacent pixels in a serpentine sequence and on boundaries creates buffer pixels. In addition, referring again to FIG. 3, the serpentine readout method employs a serpentine readout for each slice 126, e.g. by reading odd rows from left to right (primary readout stream) and even rows from right to left (secondary readout stream) starting at the top and reading down in a serpentine pattern across the columns, as shown in FIG. 3.

As was explained in the '445 patent, the electronics to read out a pixel, as well as the electronics, are designed to multiplex each pixel in a row to a sigma delta A/D converter to realize a serpentine read out to the SDM ADC. Analog to digital conversion schemes usable with the embodiments of the at least one disclosed embodiment range from an ADC per pixel, to a single ADC for the whole image array. The larger the number of ADCs, the faster the conversion of the whole image place can take place, but at the cost of power consumption and matching errors between ADCs. A single ADC as is traditionally used in charge coupled device (CCD) imagers limits the read out speed, but has the possibility for no matching errors.

In one embodiment, the at least one disclosed embodiment provides a unique readout method and apparatus that is designed to get the best performance out of SDM ADCs. The architecture of this embodiment places a small number of SDM ADCs outside of the active imaging area or pixels and uses a low power and space efficient multiplexer to implement a serpentine readout to the SDM ADC for an image slice. Note that, in FIG. 2, the multiplexer is not explicitly illustrated. In some embodiments, the multiplexer is built into the paxel itself. As will be appreciated, architectures for image processing can, for example, build a multiplexer into the output buffer in the form of a output enable onto a wired- or (tri-state) bus.

Because SDM ADCs are primarily digital in nature, the matching is better than other types of ADCs. Since there are a small number of SDM ADCs the overall power requirements are much lower than for example an ADC per pixel. In addition, another unique advantage of at least some of the embodiments of the at least one disclosed embodiment described herein is the serpentine readout that allows a band limited SDM to multiplex between multiple columns by avoiding the discontinuities at the edges of the row.

In at least one embodiment, before generating a foveated image, at least a portion of the configurable ADCs are configured for lower ENoB to reduce power consumption and higher ENoB for improved fidelity. In a further embodiment, before generating a foveated image, at least a portion of the paxels are adjusted for a predetermined tradeoff between power, bandwidth, dynamic range, and Signal to Noise Ratio (SNR).

Figure 4:
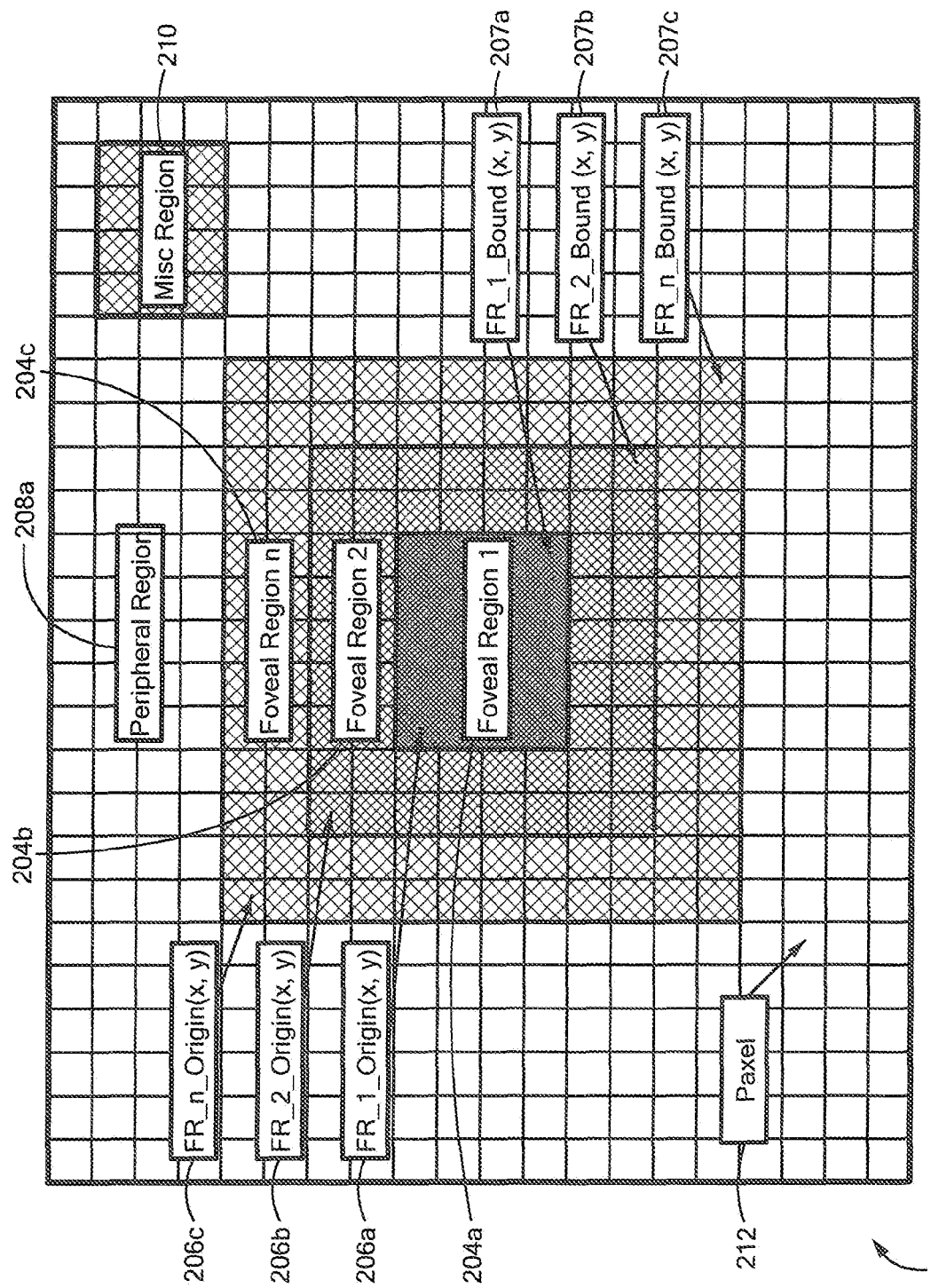
FIG. 4 is an exemplary diagram of an Image Frame Foveal view, in accordance with one embodiment.

FIG. 4 is a shaded diagram of an Image Frame Foveal view 200, in accordance with one disclosed embodiment. In particular, FIG. 4 illustrates and defines an emulated fovea 200, with user-programmable size, main fixation point (located at 204A, with a secondary fixation point at 210, which is labeled as "Misc. Region") which, in at least some embodiments, is usable with gaze contingent display implementations) and spatially-dependent image parameter layering (replicating the human biological equivalent as described above). FIG. 4 includes a plurality of foveal regions 1 through n (corresponding to the labeled foveal regions 204a, 204b, and 204c. Foveal region 1 (204a) is located in the center of the shaded area and is the center-most foveal region in FIG. 4. Foveal region 1 (204a) has a corresponding set of programmable origin registers 206a and programmable boundary registers. Foveal region 2 (204b), is located substantially concentric to foveal region 1 (204a), and likewise has its own programmable origin and boundary registers 206b, 207b, respectively. This continues all the way to the nth foveal region 204c, as will be appreciated.

In a further embodiment of this aspect, each paxel can individually be configured for a different tradeoff between power, bandwidth, dynamic range, and Signal to Noise ratio (SNR). At least a portion of the paxels can be adjusted for a predetermined tradeoff between power, bandwidth, dynamic range, and Signal to Noise Ratio (SNR). A foveal image can be generated based at least in part on the received image and at least in part on at least one of ENoB, power consumption, spatial frequency, and fixation point. This is explained further herein.

As shown in the exemplary embodiment depicted in FIG. 4, the location of the foveal regions 204a, 204b, 204c are determined by the values of the programmable Origin (206) and Bound (207) registers for each region, thus defining the overall fixation point 202 in the field of view. The programmable Origin and Bound registers 206, 207 foresee and enable, in at least some embodiment, applications that implement an adaptive fixation point, thus accommodating gaze dependent display. Providing an adaptive fixation point that accommodates a gaze dependent display can, in some embodiments, provide a significant strategic field advantage, because user head movement is not required in order to accurately identify objects in the field of view which don't happen to align with the current fixation point.

For example, in one embodiment, the systems, methods, and apparatuses of the at least one disclosed embodiment as described herein are usable with a technology such as night vision goggles, where based on the center weighted nature of the eye, there is a single fixation point in the center of the frame. As something (such as movement of an object, person, animal, or other entity or thing that is moving) attracts the user's attention, he/she will naturally turn his/her head so that the object is in the center of the frame. In another embodiment, the systems, methods, and apparatuses of the at least one disclosed embodiment as described herein are usable with a technology such as gun sights.

For example, in one embodiment, the at least one disclosed embodiment provides a so-called "cross hair" mode, wherein the frame is broken into three zones, in the X and Y directions, for a total of nine zones. Power reduction in imaging systems results in the loss of fidelity and resolution. To limit the resolution loss, in one embodiment, a cross-hair mode was introduced that helps to reduce the resolution on the perimeter of the field of view while maintaining or enhancing the resolution in the center of the field of view. The ability to dynamically change the OSR rate provides a strategic balance of power and resolution. The power reducing cross-hair mode is compared to standard operating mode.

Figure 6:
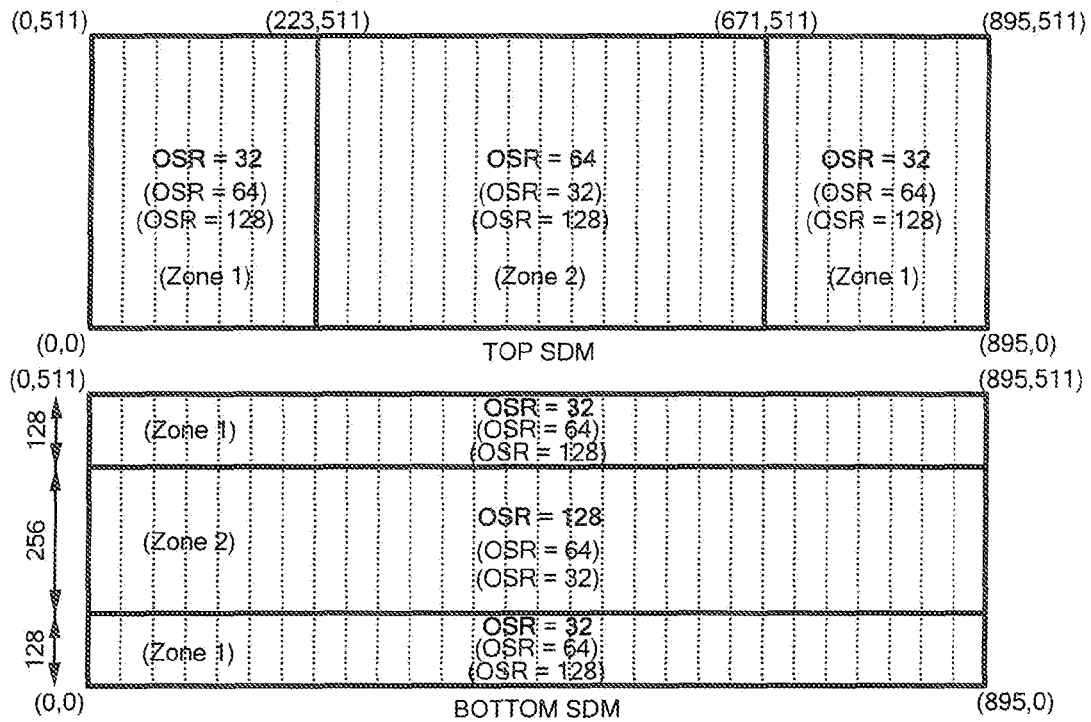
FIG. 6 is a first illustrative example of an embodiment using crosshair resolution mode, in accordance with one embodiment=1
Figure 6:
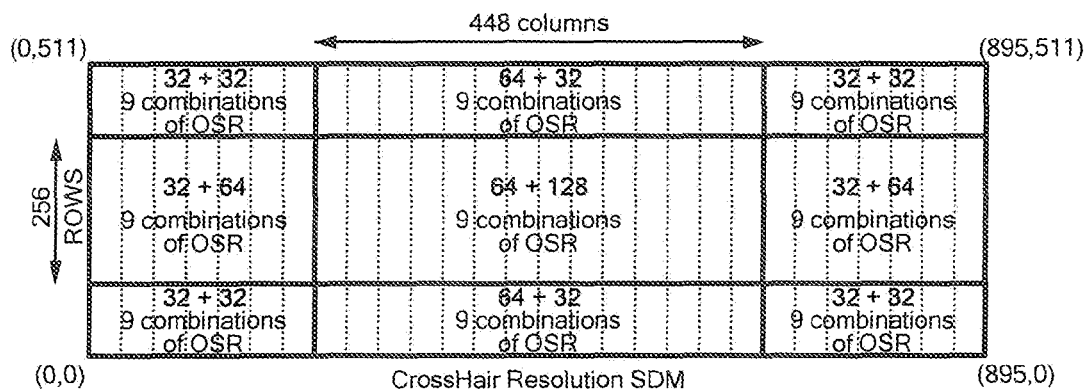
Figure 7:
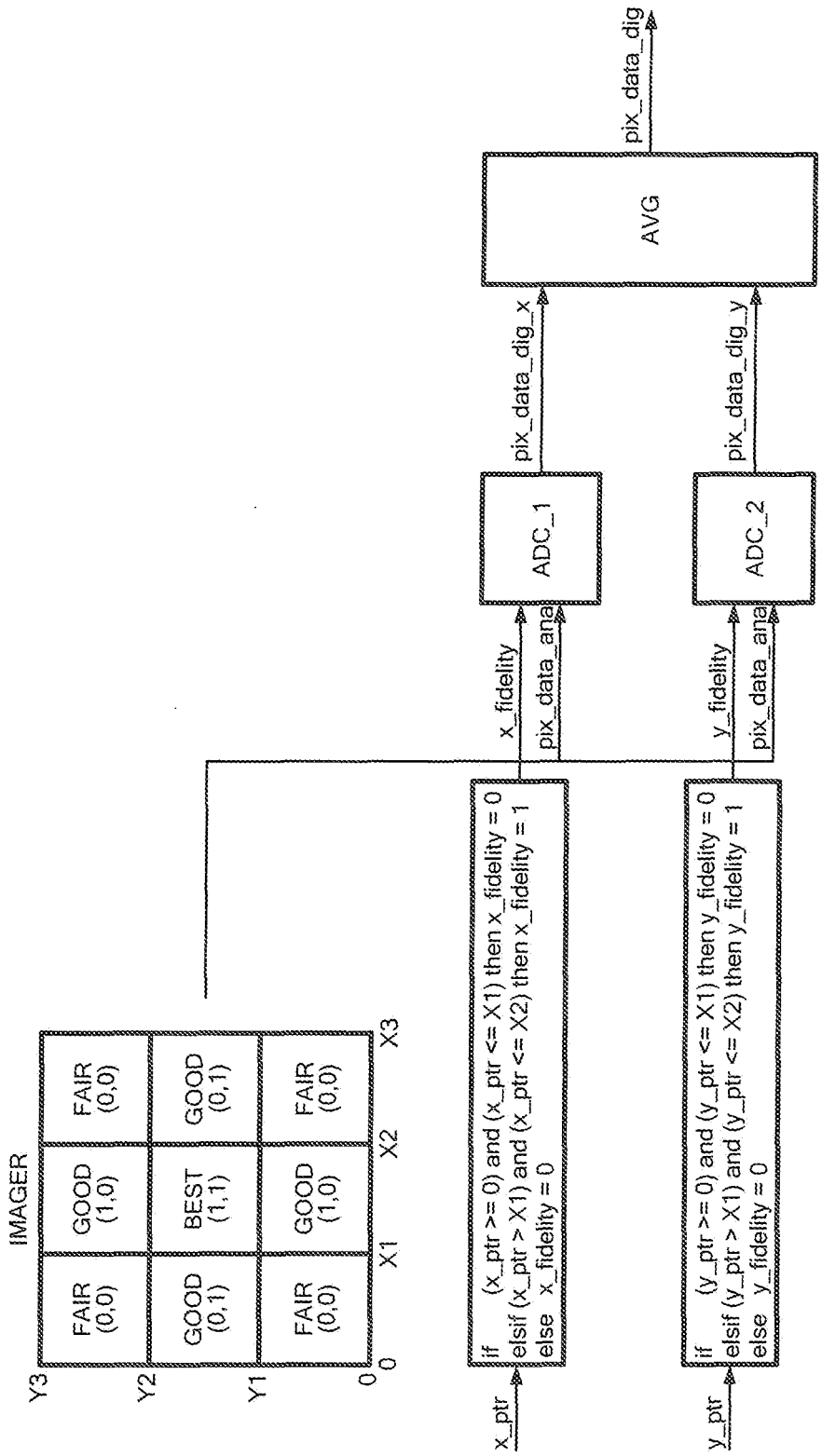
FIG. 7 is a second illustrative example of an embodiment using crosshair resolution, in accordance with one embodiment.

FIG. 6 is a first illustrative example of an embodiment using crosshair resolution mode, in accordance with one embodiment of the at least one disclosed embodiment. FIG. 7 is a second illustrative example of an embodiment using crosshair resolution, in accordance with one embodiment of the at least one disclosed embodiment Referring to FIGS. 6 and 7, to conserve power while providing the optimal resolution via oversampling ratio (OSR), this embodiment employs a crosshair pattern pixel sampling technique. By selectively controlling the OSR rates of particular sections of the array read, one can optimize resolution in the center of the imager and reduce resolution in the peripheral pixels. This technique will reduce power but not fidelity in the area of concentration.

For example, referring again to FIG. 6, the center thirds in X and Y directions are highest fidelity. In a further aspect, a foveal imager ROIC used for this embodiment advantageously uses two ADCs (although this is not required), and one of the two ADCs changes fidelity based on X location, the other changes fidelity based on Y location. The system then s the results (each pixel is sampled twice). The result is that the center ninth is best fidelity, middle of each edge is good fidelity and corner ninths are fair fidelity—effectively a "crosshair" mode. The methodology of crosshair mode also has applicability to technologies such as night vision goggles, as well.

In at least some embodiments, the implementation of a gaze dependent display requires a means by which to sense and track the position of the pupils and accordingly adjust the foveal region(s) in the imager. Usable means to sense and track the position of the pupils are known in the art (e.g., via eye tracking systems). As those of skill in the art will appreciate, these features provide a fundamentally different and improved approach as compared to prior art approaches that use varying sized pixels in a fixed radial pattern to emulate human foveal response, but which do not provide for gaze dependent display.

Referring again to FIG. 1, most of the power in the ROIC 100 is dissipated in the SDMs 124, with SDM sample clock frequency ($f_{SDM}$) being directly proportional to power dissipation (P). Therefore, $f_{SDM}$ can be altered on a paxel-by-paxel basis to reduce total average power dissipation in the device. However, as $f_{SDM}$ is reduced, bandwidth (expressed here as frame rate, $f_{FRM}$) is also reduced. In order to compensate for this effect, oversampling rate (OSR) can be reduced, but at the expense of image quality (SNR). These relationships can be expressed as follows:

$$f_{FRM} \alpha f_{SDM} \alpha P \alpha 1/OSR \; \alpha 1/SNR \qquad (1)$$

Thusly, in the foveal imager ROIC 100 described herein, inner regions (e.g., foveal region 1 (204*a*) in FIG. 4) may use high OSR for high image quality in the visually critical center foveal region while progressively reducing $f_{SDM}$ in the outer foveal (e.g., foveal region n (204*c*) in FIG. 1) and peripheral regions (e.g., peripheral region 208*a* of FIG. 4) to reduce total power consumption while also progressively reducing OSR in these visually less critical areas to maintain acceptable bandwidth.

Some previous attempts at foveal imaging reduce the physical pixel pitch (spatial resolution) to reduce bandwidth (time resolution). In contrast, in at least some embodiments described herein, the method adjusts fidelity (Signal to Noise Ratio (SNR) or voltage resolution) to reduce bandwidth. Advantageously, adjusting fidelity to reduce bandwidth allows improved dynamic adaption, because there are no physical constraints (like the aforementioned physical pixel pitch) imposed. It further should be understood that, in this embodiment, the term fidelity is used to describe number of bits of the ADC (e.g., ENoB) and resolution to describe spatial resolution—measured in pixels per inch or pixel pitch.

Figure 5:
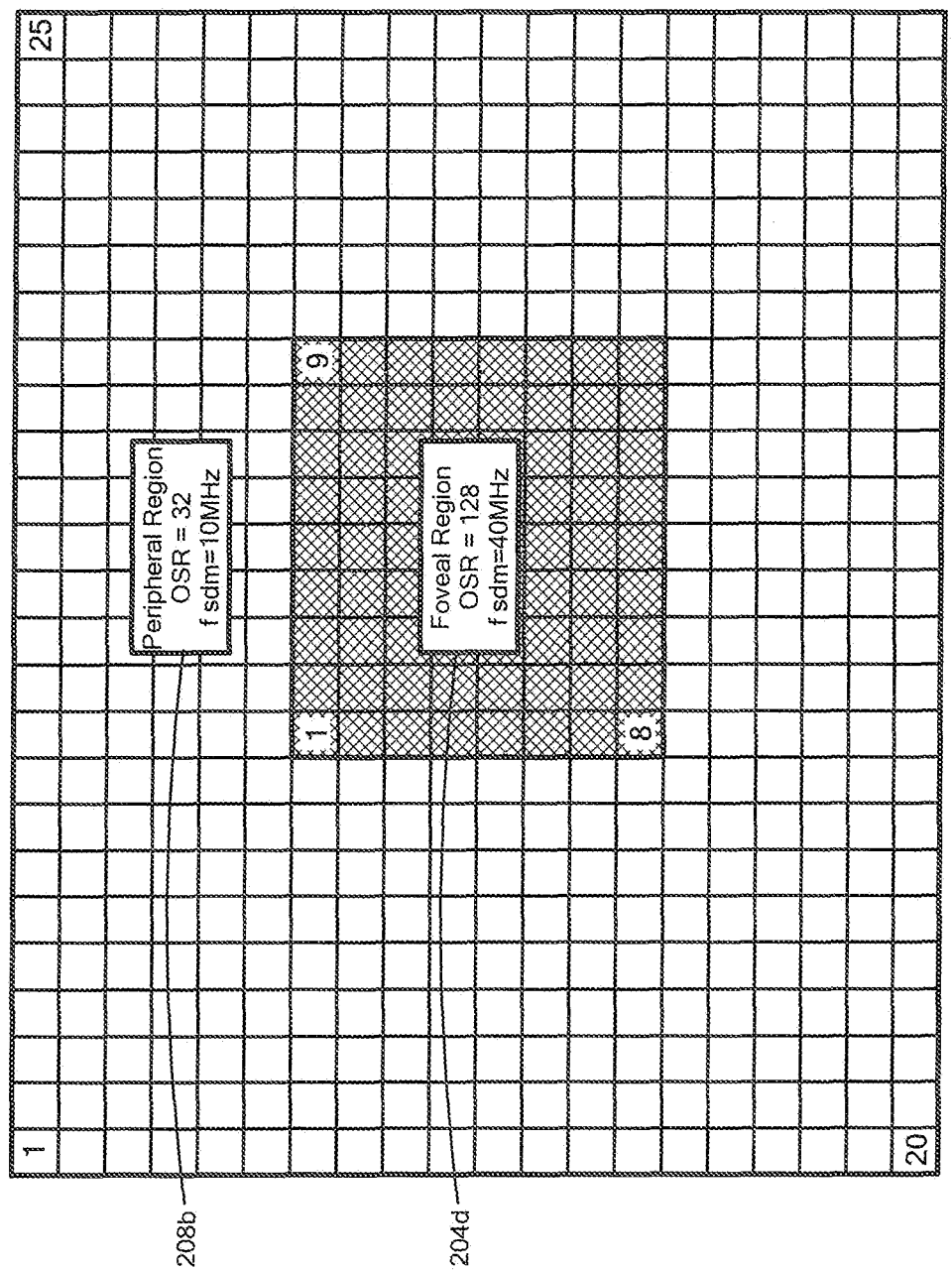
FIG. 5 is an illustrative example diagram of power reduction for an illustrative imager, in accordance with one embodiment.

As an example of the power reduction capability, consider an exemplary imager having a power reduction result as shown in FIG. 5. In the example of FIG. 5, frame rate (inversely proportional to $[1/f_{SDM}]*OSR$) was kept constant between regions (i.e., between the Foveal region 204*d* and the Peripheral region 208*b*) in order to examine the power reduction achieved when varying $f_{SDM}$ alone while adversely affecting only one of the two relevant visual parameters between the foveal frame above and an equivalent non-foveal frame (which uses the Foveal Region parameters throughout). Therefore, the only visual degradation between foveal and non-foveal image frames is reduced SNR in the peripheral region of the foveal frame. Frame rate remains the same. Given that frame rate is constant throughout and that $P \alpha f_{SDM}$, the relationship between power for a foveal frame to power for a non-foveal frame is given below, in equation (2):

$$P\_f = [(f\_sdm\_pr(num\_pax\_pr/num\_pax\_tot) + f\_sdm\_fr \\ (num\_pax\_fr/num\_pax\_tot))/f\_sdm\_fr]*P\_nf \qquad (2)$$

For the example given in FIG. 6, the following power reduction results:

$$P\_f=[(10 \text{ MHz}*(428 \text{ pax}/500 \text{ pax}) + 40 \text{ MHz}*(72 \text{ pax}/ \\ 500 \text{ pax}))/40 \text{ MHz}]*P\_nf$$

$$P\_f=[(10 \text{ MHZ}*0.86)+(40 \text{ MHZ}*0.14)/40 \text{ MHz}] \\ *P\_nf$$

$$P\_f=0.36*P\_nf$$

Given that only 14% of the frame is operating at 40 MHz while the remaining 86% of the frame is operating at only 10 MHz, the foveal imager consumes only 36% of the power dissipated in an equivalent non-foveal imager, thus realizing a 64% reduction in power consumption.

In addition to the power reductions realized by the foveal imaging concepts described above, in at least some embodiments, the present disclosure contemplates that other ways to reduce power dissipation are usable, such as via adaptations in the power supplies, analog signal processing (ASP) signal chain and/or control logic, especially as they pertain to the less critical peripheral regions.

Figure 8:
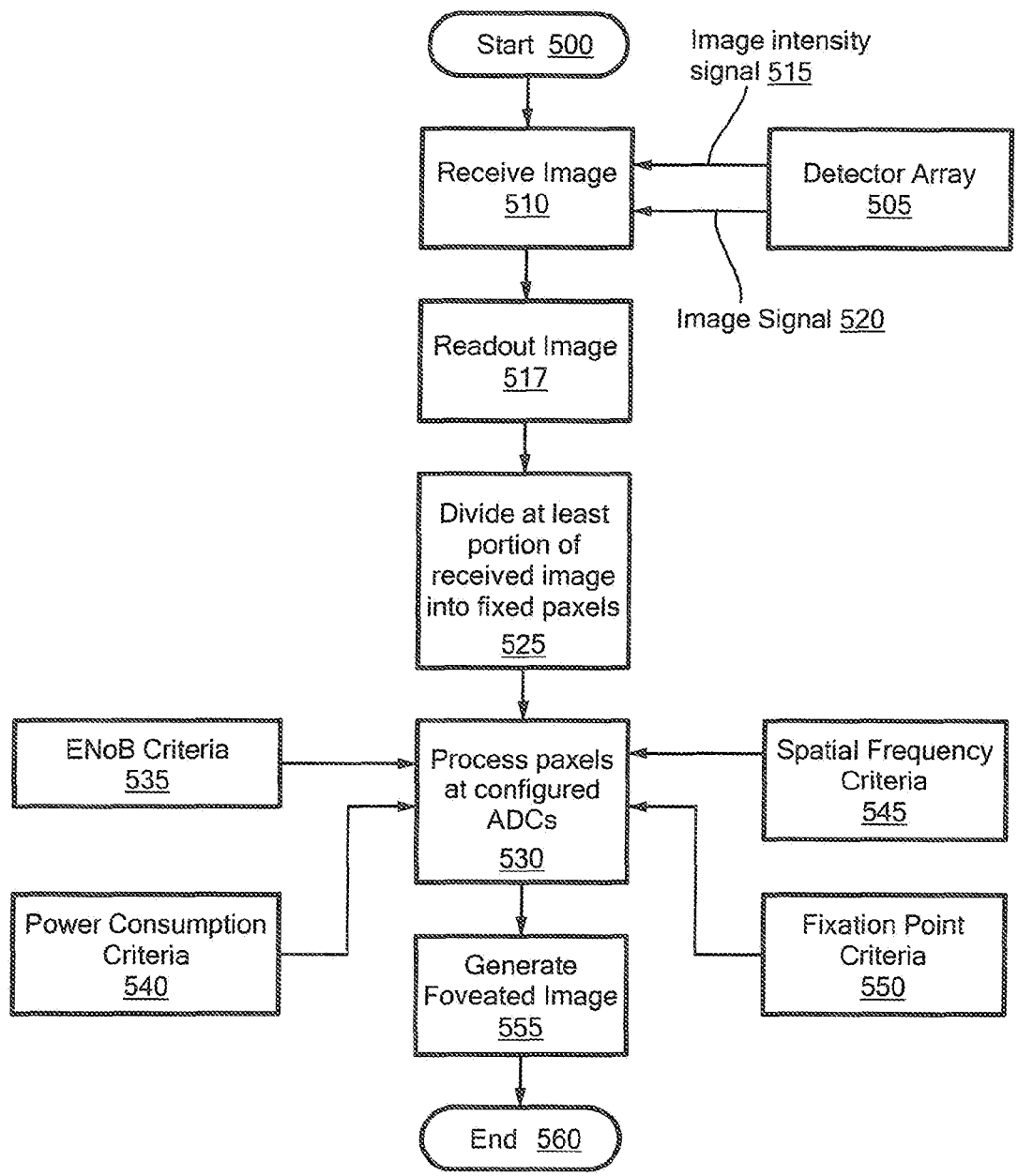
FIG. 8 is a first flowchart of a first imaging method, in accordance with one embodiment.
Figure 9:
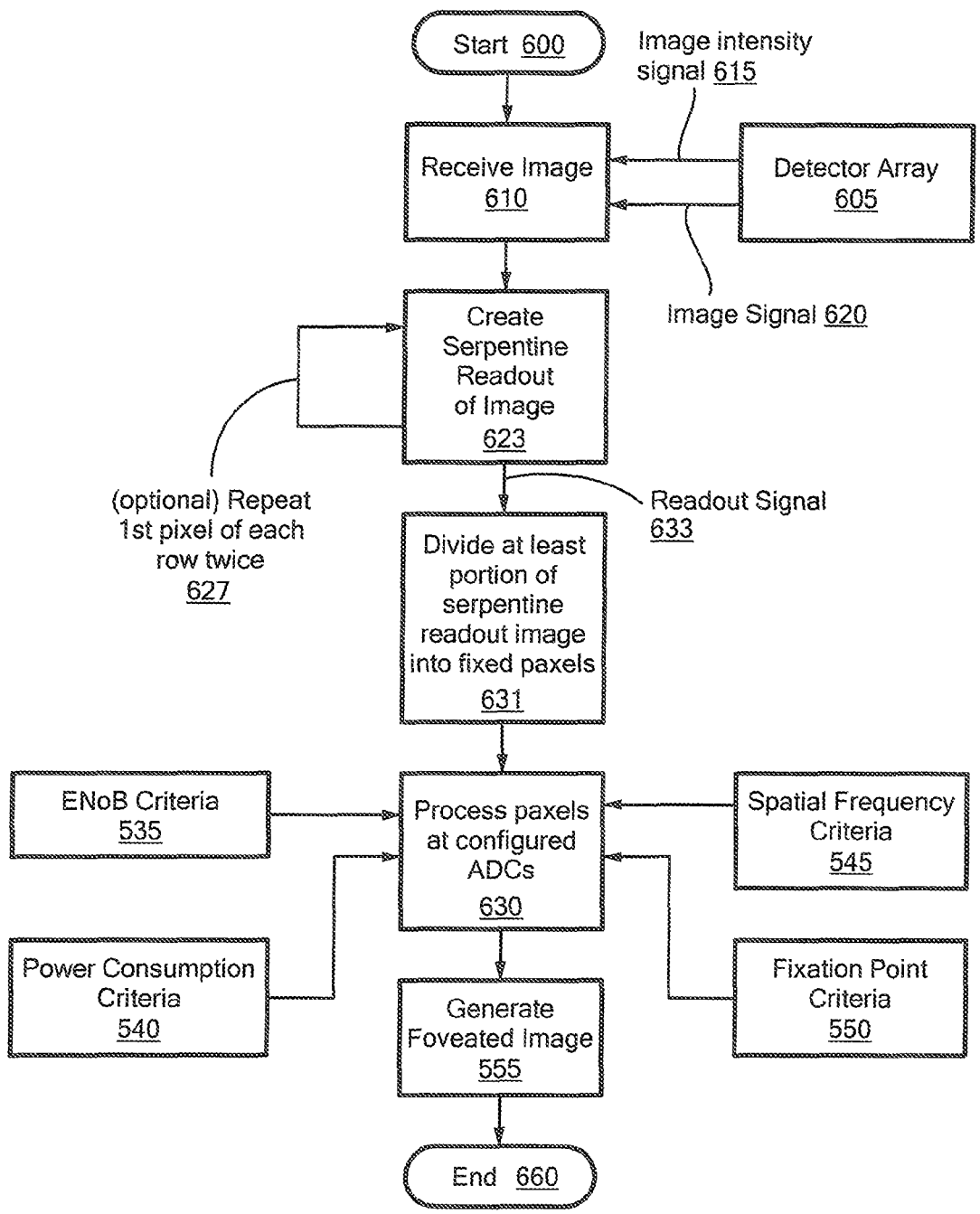
FIG. 9 is a second flowchart of a second imaging method, in accordance with one embodiment.

FIG. 8 is a first flowchart of a first imaging method, in accordance with one embodiment, and FIG. 9 is a second flowchart of a second imaging method, in accordance with one embodiment. The method of FIG. 9 is similar to that of FIG. 8, except that FIG. 9 incorporates a serpentine readout.

Referring to FIG. 8, at the start (block 500), an image is received for processing (block 510). The image comprises a plurality of pixels, each respective pixel at a predetermined pixel pitch. In one embodiment, a detector array 505 provides the received image signals, including an image signal 520 and/or an image intensity signal 515. In one embodiment, the detector array 605 is a photovoltaic device, such as a photodiode, operating in a near zero volt bias mode. In one embodiment, the detector array 605 is a photoconductive device operating in a reverse bias mode.

The image is read out (block 517), such as via readout circuitry responsive to the image intensity per pixel signal 515. In at least embodiment, the readout circuitry is controlled by row and column selection logic.

At least a portion of the received image is divided (block 525) into a plurality of fixed paxels, each respective paxel comprising a rectilinear collection of pixels, wherein each paxel has a first length having a first predetermined number of rows and a second width having a second predetermined number of columns. The paxels are then processed (block 530) at a plurality of configurable ADCs, each ADC responsive to a plurality of the paxels. The ADCs, advantageously, are configurable to process the paxels while taking into account various criteria 535-550. For example, in one embodiment, the ADCs are configurable for a tradeoff between Effective Number of Bits (ENoB) 535 and power consumption 540, while maintaining a substantially fixed spatial frequency 545 (pixels per area). In a further embodiment, fixation point criteria 550, and/or other criteria, can be used to configure one or more of the ADCs. In yet another embodiment, some or all of the ADCs can comprise SDMs, each respective SDM comprising a plurality of resonator coefficients and being capable of operating over a plurality of Over Sampling Ratios (OSRs).

In a still further embodiment, the paxels are processed (block 530) and foveal image generated (block 555), such that a plurality of digital decimation filters are provided, which are configurable for the corresponding temporal oversampling ratios (OSRs). In a still further aspect, the digital decimation filters reconstruct multi-bit pixel data with higher ENoB for ADCs with higher OSR while maintaining a constant spatial output sample rate, the spatial output sample rate being independent of OSR.

A foveal image is generated (block 555), optionally based at least in part on the received image and at least in part on the processing criteria used in block 530, including but not limited to at least one of ENoB, power consumption, spatial frequency, and fixation point. For example, in one embodiment, the foveal image is generated by setting the configurable ADCs such that the paxels corresponding to a first predetermined fixation point are digitized with a higher ENoB than other paxels. In a further embodiment, the paxels are arranged into slices with a plurality of ADCs per slice.

In one embodiment, one or more conditions are applied before generating the foveated image (block 555). For example, in one embodiment, during processing of the paxels (block 630), at least a portion of the configurable ADCs are configured for lower ENoB to reduce power consumption and higher ENoB for improved fidelity. In another embodiment, during processing of the paxels (block 630), at least a portion of the paxels are adjusted for a predetermined tradeoff between power, bandwidth, dynamic range, and Signal to Noise Ratio (SNR). In a still further embodiment, the ENoB settings (block 535) for at least a portion of the paxels are modified between frames to modify a first predetermined fixation point. For example, in one embodiment, the modification of the first predetermined fixation point is based at least in part on a determination of a field of view made by an eye tracking system.

In a still further aspect, multiple fixation points can be created on the same received image. In at least some embodiments, the fixation point would be configured before the frame is captured based on information from previous frame(s). For example, in the crosshair related embodiments described herein, configuration of a fixation point can be a static user-selected mode of operation. In another embodiment, selection of fixation point is a more dynamic type of operation. For example, a dynamic fixation point selection, in accordance with one embodiment, is implemented to be operable with one or more biometric systems, such as facial recognition software, which help to identify one or more fixation points that correspond to potential areas for higher image quality for facial recognition.

In a still further aspect, during processing of the paxels (block 530), a paxel can be digitized by a primary and a secondary ADC with independently configured ENoB, and then digitally combined. In another aspect, the paxel can be digitized by a primary and secondary ADC with independently configured ENoB, and then the ADC digital outputs are displayed on alternate frames, enabling them to be optically combined by an observer (i.e., optically combined in the eyes of an observer). For example, in one embodiment, a configuration in which the ROIC of FIG. 1 (and the associated methods) is used includes a primary and secondary camera, where the images are not combined electronically, but instead the images are displayed them on alternate frames in a video. If this displaying on alternate frames is done fast enough (e.g., at about 30 frames per second or greater) the human eye will average the outputs of the two ADCs. This concept is very similar to interlaced frames in broadcast TV, but both cameras output the entire image.

Advantageously, some or all of the blocks provided in FIG. 8 (or in FIG. 9, described further herein) are configured to emulate a human foveal response.

In at least some embodiments, the processing of the paxels and generation of the foveated image further comprise:
a. defining, within a frame of the received image, a plurality of adjacent concentric foveal regions, each respective adjacent concentric foveal region having a respective center origin around the first fixation point and a respective outer boundary located concentrically either within or around adjacent respective concentric foveal regions; and
b. wherein, as the respective outer boundary of a first respective foveal region in the plurality of foveal regions gets closer to the first fixation point, the image processing associated with the given first respective foveal region uses a respective first ENoB sufficiently high to ensure increasing image quality the closer the given respective foveal region is to the first fixation point.

In a still further aspect, settings for at least one of the center origins and outer boundaries are based at least in part on received information related to at least of a sensed and tracked position of at least one pupil of the eyes of a subject, such as output from an eye or pupil tracking system.

In yet another aspect, paxels can be adjusted for a predetermined tradeoff between power, bandwidth, dynamic range, and Signal to Noise Ratio.

Referring again to FIGS. 8 and 9, herein, in a further embodiment, when the image is read out in block 517, it is read out using a serpentine readout sequence (such as that described herein, or such as that described in the aforementioned '445 patent application) to limit or reduce the temporal bandwidth. For example, FIG. 9 is a second flowchart of a second imaging method, in accordance with one embodiment, where a serpentine readout is used. Note that, in FIG. 9, similar blocks with similar functions operate similarly to those already described for FIG. 8 and their descriptions are not repeated here.

Referring to FIG. 9, after the image is received 610 (in a manner similar to that described above), a serpentine readout of the image occurs (block 623). In one embodiment, the serpentine readout sequence of block 623 is based at least in part on at least as portion of the image intensity signals 615. In one embodiment, the serpentine readout is configured to limit a temporal bandwidth. In one embodiment, the serpentine readout comprises:
a. starting on one side of a row and sequencing the columns across the row in one direction;
b. advancing to the next row, starting with the last column read and then sequencing the columns in the opposite direction;
c. advancing to the next row, starting with the last column read and then sequencing the columns in the opposite direction; and
d. advancing to the next row and returning to the first scan direction.

In another embodiment, creating the serpentine readout 623 further comprises the unordered steps of:
a. selecting a first starting point starting at a first end of a first row of pixels in the image;
b. sequencing columns of pixels across the first row of pixels, beginning at the first starting point, in a first direction away from the first starting point and towards a first ending point that is at a second end of the first row of pixels, the second end being opposite to the first end;
c. advancing to a second row of pixels, the second row being a row located adjacent, in a first vertical direction, to the first row of pixels;
d. selecting a second starting point in the second row corresponding to a location substantially aligned to the first ending point and with the last column read in step b;
e. sequencing the columns of pixels, across the second row, in a second direction that is opposite to the first direction, towards a second ending point that is substantially aligned to the first starting point;
f. advancing to a third row of pixels, the third row of pixels being a row located immediately adjacent, in the first vertical direction, to the second row of pixels; and
g. repeating steps a. through f, to advance through at least a portion of the image, until a predetermined condition is reached (e.g., the portion of the image is complete, the end of the image is reached, the processing window moves to a larger frame, etc.).

Referring still to FIG. 9, optionally, in some embodiments, the column associated with the first pixel of each row is sequenced twice (block 627) before sequencing to the remaining pixels of the row, wherein sequencing the first column associated with the first pixel twice helps minimize a temporal bandwidth input to the ADC. In addition, sequencing the first column twice helps, in at least some embodiments, to further reduce bandwidth at the input to the ADC. Then, in some embodiments, the extra data is removed from the output image. It has been found that, in some embodiments, sequencing the first column twice (i.e., repeating the first pixel) is nearly as effective and simpler to implement than other image processing techniques, such as overlapping slices (which was described, e.g., in the aforementioned '445 application.)

It is envisioned that one or more of the embodiments described herein also could be combined with the technologies described in the commonly assigned U.S. Pat. No. 7,215,270, entitled "Sigma-Delta Modulator having selectable OSR with Optimal Resonator Coefficient,"; U.S. Pat. No. 7,576,671, entitled "Mismatch-shaping Dynamic Element Matching Systems and Methods for Multi-bit Sigma-delta Data Converters,"; U.S. Pat. No. 7,605,652, entitled "Sigma-delta Based Class D Audio Power Amplifier with High Power Efficiency,"; U.S. Pat. No. 7,612,608, entitled "Sigma-delta Based Class D Audio or Servo Power Amplifier with Load Noise Shaping,"; U.S. Pat. No. 7,860,189, entitled "Hybrid Heterodyne Transmitters and Receivers"; and U.S. Pat. No. 8,379,760, entitled "Hybrid Heterodyne Transmitters and Receivers." The contents of each of these patents are hereby incorporated by reference.

In at least some aspects, the following additional embodiments are implemented using some or all of the disclosures herein.

In one embodiment, a first foveal imaging method is implemented. An image is provided, the image comprising a plurality of pixels. At least a portion of the image is divided into a plurality of fixed paxels, each respective paxel comprising a rectilinear collection of pixels, wherein each paxel has a first length having a first predetermined number of columns per slice and a second width having a second predetermined number of columns per slice. The information in each paxel is read out (e.g., using a serpentine readout, in at least some embodiments) and used to define a first image frame. Within the image frame, a first foveal region is defined, the first foveal region having a first center oriented around a first fixation point. In addition, within the image frame, a second foveal region is defined, the second foveal region having a second center oriented around the first fixation point, wherein the first foveal region is located concentrically within the second foveal region.

Image processing is performed within the first foveal region using a first oversampling rate (first OSR) and a first sigma delta modulator (SDM) sample clock frequency (first fSDM). Image processing is also performed in a region defined between an outer boundary of the first foveal region and an outer boundary of the second foveal region using a second OSR and a second fSDM, wherein the first OSR is larger than the second OSR and the first fSDM is larger than the second fSDM. Advantageously, in at least some exemplary embodiments, one or more aspects of this method are constructed and arranged to emulate human foveal response.

For example, in one aspect, the serpentine readout is implemented by starting at the top of the respective paxel; reading odd-numbered rows from left to right; and reading even-numbered rows from right, wherein the rows from top to bottom are read in a serpentine pattern.

In a further aspect of the first foveal imaging method, at least a portion of the image can be divided into a plurality of slices; and at least a portion of each of the plurality of slices can be divided into a plurality of fixed paxels. In yet another aspect, within the image frame, a plurality of adjacent concentric foveal regions, each respective foveal region having a respective center oriented around the first fixation point and a respective outer boundary located concentrically either within or around adjacent concentric foveal regions, wherein, as the respective outer boundary of a given respective foveal region in the plurality of foveal regions gets closer to the first fixation point, the image processing associated with the given respective foveal region uses a respective OSR sufficiently high to ensure increasing image quality the closer the given respective foveal region is to the first fixation point.

In a still further aspect, within the image frame a plurality of adjacent concentric foveal regions are defined, each respective foveal region having a respective center oriented around the first fixation point and a respective outer boundary located concentrically either within or around adjacent concentric foveal regions, wherein, as the respective outer boundary of a given respective foveal region in the plurality of foveal regions gets further away from the first fixation point, the image processing associated with the given respective foveal region uses a respective fSDM that is sufficiently reduced to reduce total power consumption by an image processing circuit used for image processing.

In yet another aspect, as the respective outer boundary of a given respective foveal region in the plurality of foveal regions gets further away from the first fixation point, the image processing associated with the given respective foveal region progressively reduces OSR sufficiently to maintain acceptable bandwidth for the image processing.

In a still further embodiment, the aforementioned foveal imaging method further comprises determining the location of the first fixation point based at least in part on a determination of field of view made by an eye tracking system. For example, in one aspect, the first fixation point is defined to be an adaptive fixation point.

In yet another embodiment, within the image frame for the first foveal region, programmable origin and bound registers are configured to define the first foveal region, where by the first fixation point is determined based at least in part on settings of at least one of the programmable origin and bound registers. In one example embodiment, settings for at least one of the programmable origin and bounds registers are based at least in part on inputs received from a gaze dependent display. In another example, settings for at least one of the programmable origin and bounds registers are based at least in part on inputs received from a means for sensing and tracking position of pupils of the eyes of a subject.

In yet another aspect, in the above-described foveal imaging method, the selection of at least one of the first OSR, second OSR, first $f_{SDM}$, and second $f_{SDM}$, is based at least in part on:

$$f_{FRM} \alpha f_{SDM} \alpha P \alpha 1/OSR \; \alpha 1/SNR$$

where SNR=signal to noise ratio, P=power dissipation, OSR=oversampling rate and $f_{SDM}$=sigma delta modulator (SDM) sample clock frequency.

In yet another embodiment, a second foveal imaging method is provided, the method comprising:

(a) dividing an image, the image comprising a plurality of pixels formed into an array of rows and columns, into a plurality of fixed paxels, each respective paxel comprising a rectilinear collection of pixels, wherein each paxel has a first length having a first predetermined number of columns of pixels per slice and a second width having a second predetermined number of columns of pixels per slice;

(b) reading out each respective paxel to define a first image frame;

(c) defining, within the image frame, a first foveal region, the first foveal region having a first center oriented around a first fixation point; and (d) configuring each paxel individually to adjust a predetermined tradeoff between power, bandwidth, dynamic range, and Signal to Noise Ratio (SNR).

In another aspect of the second foveal imaging method, at least one of the first foveal region and the first fixation point are determined based at least in part on information related to a position of a pupil of an eye.

In another embodiment, a third foveal imaging method is provided, the method comprising:

(aa) dividing an image, the image comprising a plurality of pixels formed into an array of rows and columns, into a plurality of fixed paxels, each respective paxel comprising a rectilinear collection of pixels, wherein each paxel has a first length having a first predetermined number of columns of pixels per slice and a second width having a second predetermined number of columns of pixels per slice;

(bb) reading out each respective paxel to define a first image frame; and (cc) defining, within the image frame, a first foveal region, the first foveal region having a first center oriented around a first fixation point, wherein at least one of the first foveal region and the first fixation point are determined based at least in part on information related to the sensing position of a pupil of an eye.

For example, in one further aspect of the third foveal imaging method, the readout comprises a serpentine readout. In still another aspect, the information related to the position of the pupil comprises information that is sensed. In a still further aspect, the information related to the position of the pupil comprises static information. In yet another aspect, the information related to the position of the pupil comprises dynamic information. For example, in one embodiment, the dynamic information is used to dynamically adjust the first fixation point.

In still another embodiment, a fourth foveal imaging method is provided, the method comprising:

(1) dividing an image, the image comprising a plurality of pixels formed into an array of rows and columns, into a plurality of fixed paxels, each respective paxel comprising a rectilinear collection of pixels, wherein each paxel has a first length having a first predetermined number of columns of pixels per slice and a second width having a second predetermined number of columns of pixels per slice;

(2) employing a readout for each respective paxel to define a first image frame; and (3) defining, within the image frame, a first foveal region, the first foveal region having a first center oriented around a first fixation point, wherein at least one of the first foveal region and the first fixation point are determined based at least in part on information from settings of at least one of a programmable origin register and a programmable bound register.

In still another embodiment, a fifth foveal imaging method is provided, the method comprising:

(1) dividing an image, the image comprising a plurality of pixels formed into an array of rows and columns, into a plurality of fixed paxels, each respective paxel comprising a rectilinear collection of pixels, wherein each paxel has a first length having a first predetermined number of columns of pixels per slice and a second width having a second predetermined number of columns of pixels per slice;

(2) employing a readout for each respective paxel to define a first image frame; and (3) defining, within the image frame, an emulated fovea having a user-programmable size, adaptable fixation point, and spatially-dependent image parameter layering.

For any of the above methods, the readout can comprise a serpentine readout.

In a still further embodiment, a foveal imager readout integrated circuit (ROIC) imager readout architecture utilizing sigma delta analog-to-digital converters (SDM ADC) is provided. The architecture comprises:

a band-limited sigma delta modulator (SDM) ADC;
a readout;
means for dividing data slices into a plurality of fixed paxels, each respective paxel comprising a rectilinear collection of pixels, wherein each paxel has a first length having a first predetermined number of columns per slice and a second width having a second predetermined number of columns per slice;

means for determining a position of pupils of the eyes of a subject;

means for using information based on the readout and from the sensor to define a first image frame; and means for defining, within the image frame, a first foveal region, the first foveal region having a first center oriented around a first fixation point.

In a further aspect, the readout in the above-described architecture comprises a serpentine readout. In yet another aspect, the means for determining the position of the pupil comprises a sensor.

Throughout the present disclosure, absent a clear indication to the contrary from the context, it should be understood individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements have like or related alpha, numeric or alphanumeric designators. Further, while the present at least one disclosed embodiment has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the at least one disclosed embodiment must comprise more than one of that element, nor is it intended by illustrating a single element that the at least one disclosed embodiment is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing the embodiments of the at least one disclosed embodiment illustrated in the figures, specific terminology (e.g., language, phrases, etc.) may be used for the sake of clarity. These names are provided by way of example only and are not limiting. The at least one disclosed embodiment is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, processes, military programs, etc. Such terminology used herein, however, is for the purpose of description and not limitation.

Although the at least one disclosed embodiment has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the at least one disclosed embodiment. Those of ordinary skill in the art will appreciate that the embodiments of the at least one disclosed embodiment described herein can be modified to accommodate and/or comply with changes and improvements in the applicable technology and standards referred to herein. Variations, modifications, and other implementations of what is described herein can occur to those of ordinary skill in the art without departing from the spirit and the scope of the at least one disclosed embodiment as claimed. In addition, the technology disclosed herein can be used in combination with other technologies. Accordingly, the foregoing description is by way of example only and is not intended as limiting. In addition, all publications and references cited herein are expressly incorporated herein by reference in their entirety.

Having described and illustrated the principles of the technology with reference to specific implementations, it will be recognized that the technology can be implemented in many other, different, forms, and in many different environments. Having described the preferred embodiments of the at least one disclosed embodiment, it will now become apparent to one of ordinary skill in the art that other embodiments incorporating their concepts may be used. These embodiments should not be limited to the disclosed embodiments, but rather should be limited only by the spirit and scope of the appended claims. The at least one disclosed embodiment's scope is defined in the following claims and the equivalents thereto.

What is claimed is:

1. An imaging method, comprising the unordered steps of:
   a) receiving an image for processing, the image comprising a plurality of pixels, each respective pixel at a predetermined pixel pitch;
   b) receiving a plurality of image intensity signals corresponding to an intensity of the received image;
   c) receiving at least a portion of the image intensity signals at readout circuitry responsive to an image intensity per pixel;
   d) dividing at least a portion of the image into a plurality of fixed paxels, each respective paxel comprising a rectilinear collection of pixels, wherein each paxel has a first length having a first predetermined number of rows and a second width having a second predetermined number of columns;
   e) providing the plurality of fixed paxels to respective plurality of configurable Analog to Digital Converters (ADCs), each ADC responsive to a respective plurality of paxels, wherein the plurality of ADCs are configurable to generate respective ADC output signals based at least in part on implementing a tradeoff between Effective Number of Bits (ENoB) and power consumption while maintaining a substantially fixed spatial frequency;
   f) setting at least a portion of the plurality of configurable ADCs such that the paxels corresponding to a first predetermined fixation point are digitized with a higher ENoB than the other paxels; and
   g) generating a foveated image based at least in part on the received image and at least in part on at least one of ENoB, power consumption, spatial frequency, and fixation point.

2. The method of claim 1, further comprising the unordered step of:
   h) arranging at least a portion of the paxels into slices with a plurality of ADCs per slice.

3. The method of claim 1, wherein the configurable ADCs comprise Sigma-Delta Modulators (SDMs), each respective SDM comprising a plurality of resonator coefficients and being capable of operating over a plurality of Over Sampling Ratios (OSRs).

4. The method of claim 3, further comprising the unordered steps of:
   h) configuring a plurality of digital decimation filters for corresponding temporal oversampling ratios (OSRs); and
   i) reconstructing multi-bit pixel data with higher ENoB for ADCs with higher OSR while maintaining a constant spatial output sample rate, the spatial output sample rate being independent of OSR.

5. The method of claim 1, wherein the configurable ADCs comprise Successive Approximation Register (SAR) ADCs.

6. The method of claim 1, further comprising the unordered step of:
   h) creating a serpentine readout sequence based at least in part on the at least a portion of image intensity signals.

7. The method of claim 6, wherein the serpentine readout is configured to limit a temporal bandwidth.

8. The method of claim 6, wherein creating the serpentine readout further comprises the unordered steps of:
   (h-1) selecting a first starting point starting at a first end of a first row of pixels in the image;
   (h-2) sequencing columns of pixels across the first row of pixels, beginning at the first starting point, in a first direction away from the first starting point and towards a first ending point that is at a second end of the first row of pixels, the second end being opposite to the first end;
   (h-3) advancing to a second row of pixels, the second row being a row located substantially, adjacent, in a first vertical direction, to the first row of pixels;
   (h-4) selecting a second starting point in the second row corresponding to a location substantially aligned to the first ending point and with the last column read in step (h-2);
   (h-5) sequencing the columns of pixels, across the second row, in a second direction that is opposite to the first direction, towards a second ending point that is substantially aligned to the first starting point;
   (h-6) advancing to a third row of pixels, the third row of pixels being a row located immediately adjacent, in the first vertical direction, to the second row of pixels; and
   (h-7) repeating steps (h-1) through (h-6), to advance through at least a portion of the image, until a predetermined condition is reached.

9. The method of claim 8 wherein, in step (h-2), the column associated with the first pixel of each row is sequenced twice before sequencing to the remaining pixels of the row; wherein sequencing the first column associated with the first pixel twice helps minimize a temporal bandwidth input to the ADC.

10. The method of claim 1, wherein the image received for processing is provided by a detector array comprising at least one of (a) a photovoltaic device operating in a near zero volt bias mode and (b) a photoconductive device operating in a reverse bias mode.

11. The method of claim 1, wherein at least one of the following conditions is applied before generating the foveated image:
   h) at least a portion of the configurable ADCs are configured for lower ENoB to reduce power consumption and higher ENoB for improved fidelity; and
   i) at least a portion of the paxels are adjusted for a predetermined tradeoff between power, bandwidth, dynamic range, and Signal to Noise Ratio (SNR).

12. The method of claim 1, wherein the ENoB settings for at least a portion of the paxels are modified between frames to modify the first predetermined fixation point.

13. The method of claim 12, wherein the modification of the first predetermined fixation point is based at least in part on a determination of a field of view made by an eye tracking system.

14. The method of claim 1, further comprising the unordered step of creating multiple predetermined fixation points on the received image.

15. The method of claim 1, further comprising:
   h) digitizing at least one paxel by a primary and secondary ADC with independently configured ENoB; and
   i) digitally combining the outputs from the primary and secondary ADC.

16. The method of claim 1, further comprising the unordered steps of:
   h) digitizing at least one paxel using at least a primary and secondary ADC selected from the plurality of configurable ADCs; and
   i) displaying independently configured ENoB and ADC digital outputs on alternate frames such that the ENoB and ADC digital outputs are capable of being optically combined by an 20 observer of the alternate frames.

17. The method of claim 1 further comprising the unordered steps of:
   h) defining, within a frame of the received image, a plurality of adjacent concentric foveal regions, each respective adjacent concentric foveal region having a respective center origin around the first fixation point and a respective outer boundary located concentrically either within or around adjacent respective concentric foveal regions; and
   i) wherein, as the respective outer boundary of a first respective foveal region in the plurality of foveal regions gets closer to the first fixation point, the image processing associated with the given first respective foveal region uses a respective first ENoB sufficiently high to ensure increasing image quality the closer the given respective foveal region is to the first fixation point.

18. The method of claim 17, wherein settings for at least one of the center origins and outer boundaries are based at least in part on received information related to at least of a sensed and 10 tracked position of at least one pupil of the eyes of a subject.

19. A foveal imager readout integrated circuit (ROIC) imager readout architecture, comprising:
   a readout circuit configured to receive an image for processing and a plurality of image intensity signals corresponding to an intensity of the received image;
   a control input configured to receive a plurality of control signals, at least a portion of the control signals usable during processing of the received image;
   a divider module in operable communication with the readout circuit, the divider module configured to divide at least a portion of the image into a plurality of fixed paxels, each respective paxel comprising a rectilinear collection of pixels, wherein each paxel has a first length having a first predetermined number of rows and a second width having a second predetermined number of columns;
   a plurality of configurable analog to digital converters (ADCs), each respective ADC responsive to a respective plurality of paxels provided by the divider module, wherein the plurality of ADCs are configurable, using the control signals, to generate respective ADC output signals based at least in part in on implementation of a tradeoff between Effective Number of Bits (ENoB) and power consumption while maintaining a substantially fixed spatial frequency;
   means for receiving information related to at least one of eye position, pupil position, and fixation point; and
   a processor configured to generate a foveated image based at least in part on the respective plurality of ADC output signals and the information related to at least one of eye position, pupil position, and fixation point, the foveated image comprising at least a first image frame that comprises at least a first foveal region, the first foveal region having a first center oriented around a first fixation point.

* * * * *